United States Patent
Kami et al.

(10) Patent No.: US 11,002,826 B2
(45) Date of Patent: May 11, 2021

(54) DISTRIBUTED-COOPERATIVE-INFORMATION PROCESSING DEVICE, DISTRIBUTED-COOPERATIVE-INFORMATION PROCESSING METHOD, AND RECORDING MEDIUM

(71) Applicant: NEC Corporation, Tokyo (JP)

(72) Inventors: Nobuharu Kami, Tokyo (JP); Kentarou Kudou, Tokyo (JP); Shohei Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 16/099,471

(22) PCT Filed: May 15, 2017

(86) PCT No.: PCT/JP2017/018200
§ 371 (c)(1),
(2) Date: Nov. 7, 2018

(87) PCT Pub. No.: WO2017/199909
PCT Pub. Date: Nov. 23, 2017

(65) Prior Publication Data
US 2019/0187274 A1 Jun. 20, 2019

(30) Foreign Application Priority Data
May 18, 2016 (JP) .............................. JP2016-099441

(51) Int. Cl.
*G01S 7/00* (2006.01)
*G06F 1/14* (2006.01)
(Continued)

(52) U.S. Cl.
CPC .............. *G01S 7/003* (2013.01); *G01S 13/08* (2013.01); *G01S 13/42* (2013.01); *G01S 13/878* (2013.01);
(Continued)

(58) Field of Classification Search
CPC ..... G01S 5/04; G01S 5/06; G01S 5/12; G01S 7/003; G01S 13/878; G01S 13/89; G01S 13/931
See application file for complete search history.

(56) References Cited

U.S. PATENT DOCUMENTS 6,338,011 B1 * 1/2002 Furst .................... G01S 7/003
342/159
7,283,938 B1 10/2007 Friesel
(Continued)

FOREIGN PATENT DOCUMENTS

JP 5300149 A 11/1993
JP 6266560 A 9/1994
(Continued)

OTHER PUBLICATIONS

International Search Report, issued by International Searching Authority in corresponding International Application No. PCT/JP2017/018200, dated Aug. 8, 2017.
(Continued)

*Primary Examiner* — Peter M Bythrow

(57) ABSTRACT

A distributed-cooperative-information-processing device according to the present invention is allocated in a distributed manner within a predetermined field. The device measures an environment by using a sensor device; generates estimate determination information being information indicating a probability of a hypothetical set of states in the environment, based on a measurement result of the environment; receives the estimate determination information generated by another distributed-cooperative-information-processing device within the field; manages information of the another distributed-cooperative-information-processing device; and integrates the estimate determination information generated by own device and the estimate determination
(Continued)

information received from the another distributed-cooperative-information-processing device.

12 Claims, 10 Drawing Sheets

(51) Int. Cl.

| | | |
|---|---|---|
| G06F 9/46 | (2006.01) | |
| G06F 13/00 | (2006.01) | |
| G01S 13/87 | (2006.01) | |
| G06F 11/16 | (2006.01) | |
| G01S 13/42 | (2006.01) | |
| H04L 7/00 | (2006.01) | |
| G06F 15/173 | (2006.01) | |
| G01S 13/08 | (2006.01) | |
| G06F 1/12 | (2006.01) | |

(52) U.S. Cl.
CPC .................. *G06F 1/12* (2013.01); *G06F 1/14* (2013.01); *G06F 9/46* (2013.01); *G06F 11/16* (2013.01); *G06F 13/00* (2013.01); *G06F 15/173* (2013.01); *H04L 7/0016* (2013.01)

(56) References Cited

U.S. PATENT DOCUMENTS

| | | | | |
|---|---|---|---|---|
| 2003/0102997 | A1* | 6/2003 | Levin | G01S 7/006 342/57 |
| 2003/0201929 | A1* | 10/2003 | Lutter | G01S 11/12 342/52 |
| 2012/0140061 | A1* | 6/2012 | Zeng | G01S 13/867 348/135 |
| 2012/0277948 | A1* | 11/2012 | Noonan | G01S 13/726 701/23 |
| 2012/0326889 | A1* | 12/2012 | Kabler | G01S 7/4806 340/905 |
| 2016/0018511 | A1* | 1/2016 | Nayyar | G01S 13/878 342/27 |
| 2016/0097853 | A1* | 4/2016 | Kamo | G01S 13/584 342/70 |
| 2016/0223651 | A1* | 8/2016 | Kamo | G01S 13/426 |
| 2017/0277716 | A1* | 9/2017 | Giurgiu | G06F 16/2365 |
| 2018/0074191 | A1* | 3/2018 | Bilik | G01S 13/931 |

FOREIGN PATENT DOCUMENTS

| | | |
|---|---|---|
| JP | 863581 A | 3/1996 |
| JP | 10104354 A | 4/1998 |
| JP | 2002277533 A | 9/2002 |
| JP | 200397900 A | 4/2003 |
| JP | 2005210461 A | 8/2005 |
| JP | 2005233723 A | 9/2005 |
| JP | 2006105897 A | 4/2006 |
| JP | 2007212299 A | 8/2007 |

OTHER PUBLICATIONS

Xiao, et al., "A Scheme for Robust Distributed Sensor Fusion Based on Average Consensus", Proceedings of the 4th International symposium on Information Processing in Sensor Networks, Apr. 2005, pp. 63-70 (8 pages total).

Liang, et al., "Design and Analysis of Distributed Radar Sensor Networks", IEEE Transactions on Parallel and Distributed Systems, pp. 1926-1933, vol. 22, No. 11, Nov. 2011 (8 pages total).

* cited by examiner

DISTRIBUTED-COOPERATIVE-INFORMATION PROCESSING DEVICE, DISTRIBUTED-COOPERATIVE-INFORMATION PROCESSING METHOD, AND RECORDING MEDIUM

This application is a National Stage Entry of PCT/JP2017/018200 filed on May 15, 2017, which claims priority from Japanese Patent Application 2016-099441 filed on May 18, 2016, the contents of all of which are incorporated herein by reference, in their entirety.

TECHNICAL FIELD

The present invention relates to a distributed-cooperative-information-processing device, a distributed-cooperative-information-processing method, and a recording medium.

BACKGROUND ART

Devices that are small and have high arithmetic processing performance and communication processing performance are increasing, based on development of hardware and software technologies relating to recent information and communication technology (ICT). On the other hand, when very high processing performance that exceeds a predetermined level is required, large-sized and expensive devices are still needed.

Therefore, instead of designing a large-sized and expensive device that satisfies various applications or required performance, a system in which performance equivalent to a large-sized device is realized by combining a large number of small-sized devices having performance to some extent is being studied. Sensor fusion or data fusion is one example thereof, and instead of an expensive and high-performance sensing device, a large number of relatively inexpensive sensor devices are combined, and thereby an advanced system is realized.

For example, in a distributed radar sensor network, a plurality of radar sensors are allocated in a distributed manner, and thereby high detection performance is realized by collecting sensing information at various points (see, for example, NPL 1). In a distributed radar sensor network, because a plurality of radar sensors are allocated in a distributed manner, there is an advantage that, even when search from a certain one direction is difficult due to a topographical factor or the like, a monitorable range can be expanded by executing measurement from multiple directions.

In a system that realizes high-level information by integrating a large number of pieces of sensing information and the like as in the distributed radar sensor network, data fusion is executed at a relatively high frequency. The data fusion is a technique for processing a plurality of pieces of information different in type to higher-level information by collecting and integrating them. PTL 1, for example, describes a technique for increasing accuracy of information by integrating pieces of information measured by a plurality of radar sensors. Further, PTL 2 describes a technique for integrating a plurality of pieces of sensor data for identification classification of a monitoring target.

In the techniques described in PTLs 1 and 2 and NPL 1, it is assumed that information is consolidated on a centralized server and the consolidated information is computed. However, a technique for executing processing only local information with cooperating an adjacent node in a distributed manner without using a centralized server is also studied. NPL 2, for example, describes an average consensus method designed in such a way that a plurality of nodes connected by a network mutually exchange or update information and thereby variables included in the respective nodes are converged to an average value of the whole. By using this mechanism, a technique for estimating a maximum likelihood state from data acquired by a plurality of sensor nodes and the like is studied.

As inventions relating to the present invention, there are PTLs 3 to 6. PTL3 discloses a method for generating an autonomous cooperative subsystem in a communication system. PTL 4 discloses a technique for integrating information relating to an observation target. PTL 5 discloses a technique for recognizing an external environment. PTL 6 discloses a technique relating to control of a path in a network including autonomous distributed control nodes.

CITATION LIST

Patent Literature

[PTL 1] Japanese Unexamined Patent Application Publication No. H10-104354
[PTL 2] U.S. Pat. No. 7,283,938 description
[PTL 3] Japanese Unexamined Patent Application Publication No. H05(1993)-300149
[PTL4] Japanese Unexamined Patent Application Publication No. H06(1994)-266560
[PTL 5] Japanese Unexamined Patent Application Publication No. H08(1996)-063581
[PTL6] Japanese Unexamined Patent Application Publication No. 2005-210461

Non Patent Literature

[NPL 1] Jing Liang, Qilian Liang, "Design and analysis of distributed radar sensor networks", IEEE TRANSACTIONS ON PARALLEL AND DISTRIBUTED SYSTEMS, VOL. 22, NO. 11, NOVEMBER 2011
[NPL 2] Lin Xiao, Stephen Boyad, Sanjay Lall, "A scheme for robust distributed sensor fusion based on average consensus", Proceedings of the 4th International symposium on Information Processing in Sensor Networks (IPSN '05), Apr. 24-27, 2005, pp. 63-70

SUMMARY OF INVENTION

Technical Problem

As described above, in the techniques described in PTLs 1 and 2 and NPL 1, it is assumed that, when integrating data, a centralized server unitarily manages and processes data. Therefore, for example, in the case of a large-sized system, it is necessary to collect and process a large amount of data in real time, and a communication load on a network and a calculation load on a centralized server are increased. Further, since individual devices each including a sensor allocated in a distributed manner and the like also need long-distance communication with a centralized server, the number of components of the device is increased and power consumption is also increased. Furthermore, a centralized server is a single point of failure of a system, and therefore there is an issue in failure tolerance.

On the other hand, the technique described in NPL 2 uses convergence to an arithmetic average value of variables included in each node, and therefore handles only information calculable from an average value of pieces of information integrated based on an arithmetic sum. Therefore, in order to execute a more general operation by using the technique described in NPL 2, information of the number of nodes currently participating in a network is needed. Thus, it is difficult to use the technique described in NPL 2 for advanced information integration that needs an operation other than an average value. In other words, in maximum likelihood estimation processing using the distributed technique described in NPL 2, there is an issue that it is difficult to execute general integration processing for estimate determination information. When, for example, an average consensus method is used, it is possible to execute convergence, at high speed, to an arithmetic average of variables intended to be determined based on a completely distributed operation and it is possible to execute average estimation and the like. However, in the technique described in NPL 2, it is difficult to execute integration processing for estimate determination information that is more general and probabilistic. Further, when such advanced integration processing is executed, there is no mechanism that can realize a stable operation considering a case in which the number of nodes currently operating normally varies, based on an unpredictable node failure or the like.

PTLs 3 to 6 do not either disclose a technique for solving the issues described above.

The present invention is made in order to solve the issues included in the background techniques as described above. An object of the present invention is to eliminate a need for a centralized server that is a single point of failure of a system and to provide a distributed-cooperative-information-processing device, a distributed-cooperative-information-processing method, and a recording medium that are capable of stably executing estimate determination processing even when there is a node failure or the like.

Solution to Problem

For achieving above-mentioned objection, a distributed-cooperative-information-processing device according one aspect of the present invention is allocated in a distributed manner within a predetermined field. The device includes:
 a memory storing a program
 at least one processor coupled to the memory,
 the processor performing operations, the operation comprising:
  measuring an environment by using a sensor device;
  generating, based on a measurement result of the environment, estimate determination information being information indicating a probability of a hypothetical set of states in the environment;
  receiving the estimate determination information generated by another distributed-cooperative-information-processing device within the field;
  managing information of the another distributed-cooperative-information-processing device; and
  integrating the estimate determination information generated by own device and the estimate determination information received from the another distributed-cooperative-information-processing device.

A distributed-cooperative-information-processing method according one aspect of the present invention is executed by a distributed-cooperative-information-processing device allocated in a distributed manner within a predetermined field. The method includes:
 measuring an environment by using a sensor device;
 generating, based on a measurement result of the environment, estimate determination information being information indicating a probability of a hypothetical set of states in the environment;
 receiving the estimate determination information generated by another distributed-cooperative-information-processing device within the field;
 managing information of the another distributed-cooperative-information-processing device; and
 integrating the estimate determination information generated by own device and the estimate determination information received from the another distributed-cooperative-information-processing device.

A non-transitory computer-readable recording medium according one aspect of the present invention embodies a program. The program causes a computer allocated in a distributed manner within a predetermined field to perform a method. The method includes:
 measuring an environment by using a sensor device;
 generating, based on a measurement result of the environment, estimate determination information being information indicating a probability of a hypothetical set of states in the environment;
 receiving the estimate determination information generated by another computer within the field;
 managing information of the another computer that receive the estimate determination information;
 managing information of the another computer; and
 integrating the estimate determination information generated by a local device and the estimate determination information received from the another computer.

Advantageous Effects of Invention

According to the present invention, it is possible that a centralized server that is a single point of failure of a system is unnecessary and estimate determination processing is stably executed even when there is a node failure or the like.

EXAMPLE EMBODIMENT

Next, the present invention is described by using the drawings.

First Example Embodiment

Figure 1:
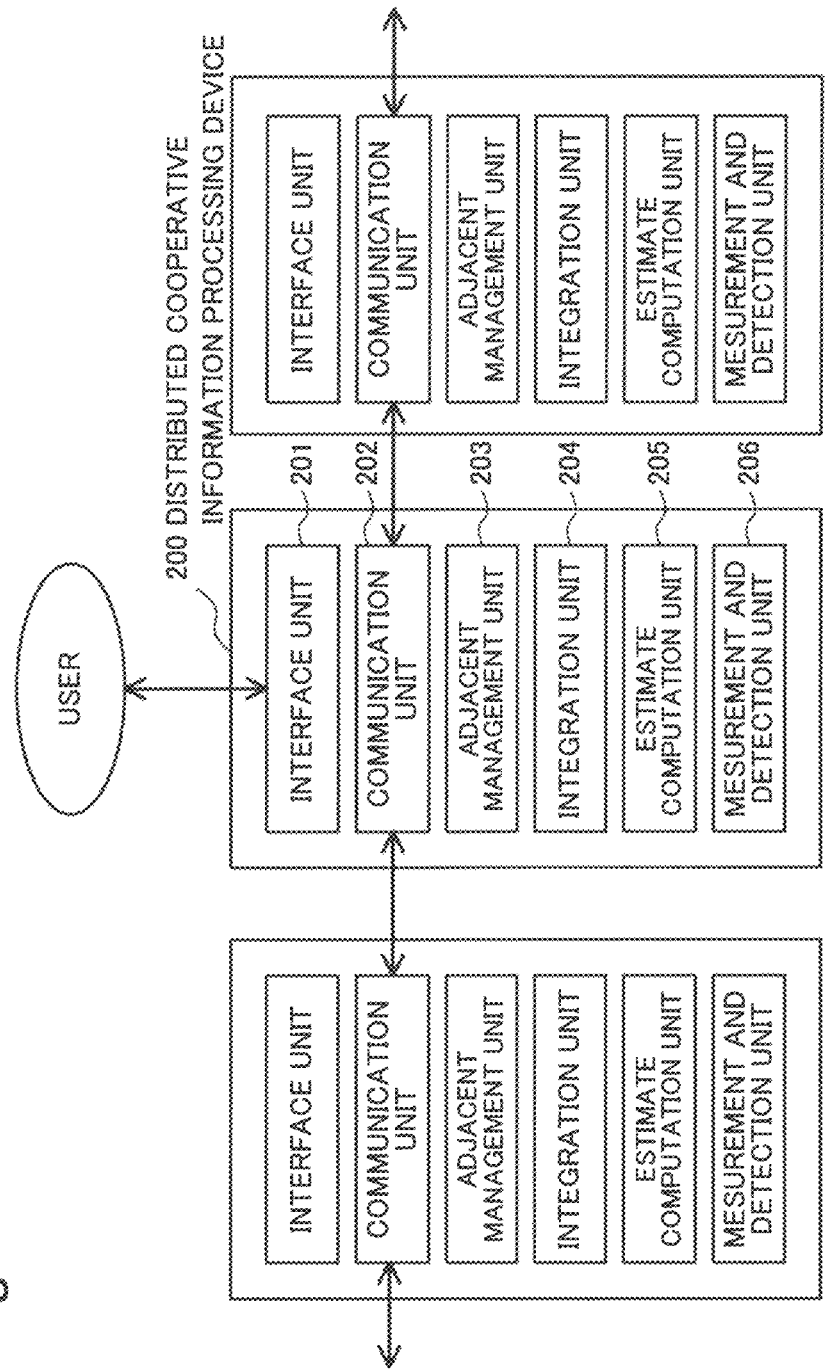
FIG. 1 is a block diagram illustrating one configuration example of a distributed-cooperative-information-processing system according to a first example embodiment.

FIG. 1 is a block diagram illustrating one configuration example of a distributed-cooperative-information-processing system according to a first example embodiment.

As illustrated in FIG. 1, the distributed-cooperative-information-processing system of the first example embodiment includes a plurality (three units in FIG. 1) of distributed-cooperative-information-processing devices 200 allocated in a distributed manner within a predetermined field. In the distributed-cooperative-information-processing system, the respective distributed-cooperative-information-processing devices 200 are configured to be communicably connected and form a network. In the following, the distributed-cooperative-information-processing device 200 that forms a network may be referred to simply as a "node".

The distributed-cooperative-information-processing device 200 includes an interface unit 201, a communication unit 202, an adjacent management unit 203, an integration unit 204, an estimate computation unit 205, and a measurement and detection unit 206.

The interface unit 201 is a command line interface (CLI), a graphical user interface (GUI), or the like that presents information to a user of the distributed-cooperative-information-processing system or accepts an operation command or the like from the user. The user refers to information included in the distributed-cooperative-information-processing device 200 as visual information such as a table format, a text format, a graph, a map, a topographical diagram, or the like, by using a display device that is not illustrated. Alternatively, the user can modify or update a setting parameter of each of the unit described above or input a command for controlling an operation or the like, by using an input device (a keyboard, a mouse, or the like) that is not illustrated.

The communication unit 202 is a communication device for transmitting and receiving data to and from an adjacent distributed-cooperative-information-processing device 200 (hereinafter, referred to as an adjacent node), a terminal device (not illustrated) of a user, or the like via a network. The communication unit 202 uses a well-known communication protocol such as transmission control protocol (TCP)/Internet protocol (IP) and thereby provides a transmission and reception function of information to and from an adjacent node, a terminal device of a user, or the like. The communication unit 202 may exchange necessary information with an adjacent node or a terminal device of a user and does not limit a communication method thereof. The communication unit 202 can use, as a terminal device, a tablet-type or book-type personal computer or an information processing device such as a mobile phone.

The adjacent management unit 203 manages information (a list of node identifications (IDs), IP addresses, or the like) of adjacent nodes that transmit and receive information, information (a user ID or the like) of a user who is permitted access, access restriction information thereof, or the like. Adjacent node information may be manually set by a user. Alternatively, adjacent node information may be automatically registered or deleted by the adjacent management unit 203 in accordance with a previously determined procedure or rule. A registration method for adjacent node information includes, for example, a method for registering a predetermined number of nodes preset in order from a closest node among nodes within a predetermined distance from the own node. However, the method for registering adjacent node information is not limited to this method. Adjacent node information may be dynamically updated by eliminating a node that becomes communication impossibility or a node in which communication quality is markedly degraded based on a node failure, link failure or the like, or by newly adding another node, as needed.

A network may have, for example, a configuration for connecting a predetermined number of nodes randomly selected, a configuration for connecting nodes in a star-shaped manner with respect to a representative node, or a configuration hierarchized in such a way as to form a tree shape with respect to a representative node. In the case of a tree shape, by repeating processing of connecting a lowermost-layer subgroup formed with a closest node to a representative node and further connecting the representative node to an upper node, a configuration in which a mesh network is formed with uppermost nodes is made possible. Further, in a network, by considering a mixing speed (a reaching speed of information to all nodes) of information for all nodes, for example, a configuration in which only respective predetermined numbers of near nodes and far nodes with respect to the own are connected at random is possible.

The measurement and detection unit 206 includes various types of sensor devices for measuring an environment of the distributed-cooperative-information-processing device 200 and generates detection information that is information for understanding an environment from measurement data of the sensor device. When, for example, the measurement and detection unit 206 includes a radar range finder, the radar range finder transmits a radio wave, measures a reflected wave thereof, and thereby measures a distance and a direction to an obstacle. Detection information in this case includes, for example, information indicating a distribution of a reflected wave intensity and the like with respect to a distance for each direction. The sensor device includes a Doppler detection sensor, an infrared sensor, an ultrasound sensor, a temperature sensor, a humidity sensor, a camera, a microphone, or the like.

The estimate computation unit 205 generates and manages local information that is higher-order estimate determination information from the detection information described above. When the detection information is, for example, information indicating measurement results of multiple times of a reflected wave intensity with respect to a distance for each direction based on a radar range finder, as high-order estimate determination information, there is information indicating a probability of existence of an obstacle at each point within a field. Hereinafter, such information is referred to as map information and is used as a main example of estimate determination information. The estimate determination information is not limited to map information, and any information is employable when being information indicating a probability of a hypothetical set of states in an environment acquire from a measurement result as will be described later.

As simplest map information, a histogram is conceivable. A histogram can be generated, for example, by dividing an area measurable by a sensor device at a predetermined distance section and counting a detection frequency of an obstacle in a distance section relating to a detection position of the obstacle in which a reflected wave intensity exceeds a predetermined threshold. In general, a measurement result using a sensor device includes various types of measurement noise. Therefore, a histogram includes an error detection based on measurement noise. The histogram is conceivable as information indicating a detection probability of an obstacle for each distance section in an environment during measurement.

An example in which as a radar range finder, for example, a radio wave having strong directionality having a predetermined spread angle ($d\theta$, $d\varphi$) is used and a direction ($\theta$, $\varphi$) in a three-dimensional space is measured is considered. ($\theta$, $\varphi$) is an angle component upon polar coordinates display. Herein, when a width of a distance section is designated as dr, one section of a histogram is a volume fragment represented by a distance section [r, r+dr] and an angle section [$\theta$, $\theta+d\theta$] and [$\varphi$, $\varphi+d\varphi$]. A frequency of a histogram in this volume fragment is a value of map information relating to a spatial portion related.

Further, when as a radar range finder, an omnidirectional radar is used, a radio wave spreads omnidirectionally as a spherical wave, and therefore one section of a histogram is represented by a spherical-shell-shaped distance section [r, r+dr] including no angle information. Therefore, a frequency of a histogram of the section is a value of map information relating to a spatial portion in a three-dimensional space divided in a spherical-shell-shaped manner.

However, a measurement value indicates a relative distance in which a position of a node is an origin, and therefore map information is expressed by absolute coordinates corrected from position coordinates of the node. An area measurable by one node is limited, and therefore map information generated for each node is local information in which a position of the node is centered and for map information outside a measurable area, 0 is set.

The integration unit 204 generates totally-integrated map information that is map information of the entire system by integrating map information, which is managed by adjacent nodes and acquired from the each adjacent node which is managed by the adjacent management unit 203, and map information managed by the own node. The integration unit 204 executes integration processing of integrating map information managed by adjacent nodes and map information managed by the own node one or more times.

A technique for generating totally-integrated map information depends on contents of map information. For example, in the case of the above-described histogram, the generation technique is an integration operation generating a histogram of the entire system by adding detection frequencies of an obstacle in the same point measured by a plurality of nodes. A method for generating more advanced map information is described later.

Each node acquires respective pieces of map information via the communication unit 202 from each adjacent node managed by the adjacent management unit 203, integrates the acquired information with map information of the own node, and updates the map information to new map information. A plurality of integration methods without using a centralized server are known. As one integration method, for example, the following technique is available. The technique forms a tree-shaped network by using a spanning tree protocol or the like. Then, the technique integrates map information in each node while uploading map information on an upstream side toward a root node. Then, the technique reports totally-integrated map information generated at the root node finally to a downstream node.

As a more general method, in a flat-structure network, there is a method in which each node executes convergence to totally-integrated map information while each node repeatedly exchanges information with an adjacent node. In any of the methods, all nodes preferably include the same totally-integrated map information from a viewpoint of failure tolerance, ease of access to totally-integrated map information, and the like.

Herein, in a flat network structure, a method for generating totally-integrated map information by integrating map information while information exchange is repeated multiple times is briefly described.

Processing leading to generation of local map information based on an estimation operation from the above-described measurement result and integration among respective nodes is an outline of processing at a certain time. By repeating similar processing at any interval, each node can update totally-integrated map information at each time. Note that it is desirable that all nodes are time-synchronized and timings of start and stop operations of nodes are matched with one another. However, it is unnecessary that all nodes always operate at the same timing and interval.

Figure 2:
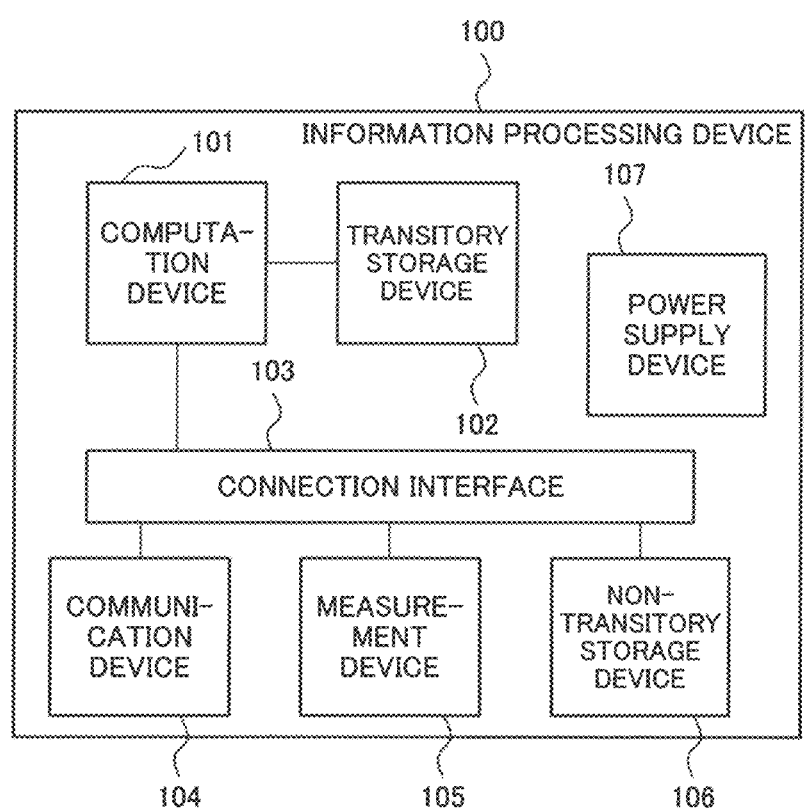
FIG. 2 is a block diagram illustrating one configuration example of hardware of an information processing device that realizes a function of a distributed-cooperative-information-processing device illustrated in FIG. 1.

The distributed-cooperative-information-processing device 200 illustrated in FIG. 1 can be realized, for example, by using the information processing device 100 illustrated in FIG. 2.

FIG. 2 is a block diagram illustrating one configuration example of hardware of an information processing device that realizes a function of the distributed-cooperative-information-processing device illustrated in FIG. 1.

As illustrated in FIG. 2, an information processing device 100 includes a computation device 101, a transitory storage device 102, a connection interface 103, a communication device 104, a measurement device 105, a non-transitory storage device 106, and a power supply device 107.

The computation device 101 is a processor such as a central processing unit (CPU). The computation device 101 executes processing in accordance with a program stored on the non-transitory storage device 106 and thereby realizes various types of functions included in the distributed-cooperative-information-processing device 200 illustrated in FIG. 1.

The transitory storage device 102 is a storage device such as a random access memory (RAM) that transitorily stores data used for processing of the computation device 101 and can rewrite data at high speed.

The connection interface 103 is a computer bus such as a peripheral component interconnect (PCI) bus and an interface that connects devices included in the information processing device 100 in such a way as to be able to transmit and receive data.

The communication device 104 is a device for connection to an external network and is a wireless network adapter such as WiFi (®) or Bluetooth (®). The communication device 104 may be a wired network adapter for connection to a network in a wired manner.

The measurement device 105 is a radar range finder or a sensor device for measuring an environment such as a thermometer.

The non-transitory storage device 106 is a non-transitory data accumulation device that stores a program for executing processing by the computation device 101, the above-described adjacent node information, a user ID and access restriction information, a processing result in the computation device 101, and the like. The non-transitory storage device 106 is a non-transitory data accumulation device such as a hard disk drive or a solid state drive (SSD).

The power supply device 107 is a power supply device including a battery, a solar cell, or the like for supplying necessary power to devices included in the information processing device 100. The devices included in the information processing device 100 are the computation device 101, the transitory storage device 102, the connection interface 103, the communication device 104, the measurement device 105, and the non-transitory storage device 106.

The information processing device 100 is not limited to the configuration illustrated in FIG. 2 and may further include, for example, a field-programmable gate array (FPGA), an off-road engine, or a processing device such as a microcomputer that executes specific processing in a dedicated manner.

Next, a method for generating local map information in the estimate computation unit 205 is described.

In the above description, a technique for dividing an area that can be sensed by a radar range finder into a plurality of distance sections, integrating measurement data for each distance section, and generating a histogram is used. However, more commonly, a technique for numerically expressing probabilities of a case in which there is an obstacle in the distance section (referred to as a hypothesis $\omega_1$) and a case in which there is no obstacle therein (referred to as a hypothesis $\omega_2$) is effective. The estimate computation unit 205 calculates, for example, by using the Bayesian estimation method and the like, conditional probabilities $P[\omega_1|Z]$ and $P[\omega_2|Z]$ of $\omega_1$ and $\omega_2$ in which a measurement result Z of a histogram is acquired for each point (position X) of a field.

A relation of a conditional probability is represented by the following proportional expression (1) based on the Bayes' theorem.

[Proportional Expression 1]

$$P[\omega_i|Z] \propto P[Z|\omega_i]P[\omega_i] \quad (1)$$

Since this relation exists, the estimate computation unit 205 can determine $P[\omega_i|Z]$ when a prior probability $P[\omega_i]$ and a conditional probability $P[Z|\omega_i]$ are found.

Commonly, $P[\omega_i]$ is unknown. Therefore, the estimate computation unit 205 may assume that a prior probability is a uniform distribution in a first measurement ($P[\omega_i]=0.5$ in this case) and use, in the following measurement, a probability $P[\omega_i|Z]$ of a last measurement result as a prior probability.

$P[Z|\omega_i]$ is determined based on a sensor device or a measurement environment. The above-described histogram indicates a measurement result Z. Therefore, the estimate computation unit 205 can determine, for example, from a measurement result Z and a fitness of a theoretical value distribution thereof, a probability $P[Z|\omega_i]$ in which a measurement result Z of a hypothesis $\omega_i$ is acquired. In this case, map information is a two-dimensional vector ($P[\omega_1|Z]$, $P[\omega_2|Z]$) with respect to each point of a field. However, in a case of further generalization, there is a method using a belief function based on the Dempster-Shafer theory (hereinafter, referred to as the DS theory) or a transferable belief model (hereinafter, referred to as a TBM).

In the DS theory or TBM, map information is expressed by a support m(A) for any subset $A \subseteq \Omega$ of a hypothetical set $\Omega = \{\omega_1, \omega_2\}$. This amount is referred to as a basis belief assessment (BBA).

The subset A is a subset represented in the following logical expression 1.

$$A \in \{\phi, \{\omega_1\}, \{\omega_2\}, \Omega\}. \quad \text{[Logical expression 1]}$$

In logical expression 1,
[Logical symbol 2]
$\phi$
is an empty set. A BBA is a four-dimensional vector. Herein, for a support m(A), a value that satisfies $\Sigma_A m(A)=1$ is set.

When A of m(A) has a value equal to or more than 0 only in a singleton hypothesis (m(A)=0 for $|A|\neq1$, wherein $|A|$ is the number of elements of a subset A), the DS theory or TMB is completely the same as the Bayesian estimation method. The DS theory or TMB includes the Bayesian estimation as a special case.

The singleton hypothesis is a hypothesis that only one element is included.

Note that the above-described $P[Z|\omega_i]$ in the Bayesian estimation can be assumed as a likelihood function $L[\omega_i|Z]$. When a likelihood function is found, m(A) is systematically set, for example, by using the generalized Bayesian theory (GBT) within a framework of TBM. However, as a method for setting m(A), there is also a technique for selecting a most probable hypothesis by using any determination logic (e.g. the Bayesian estimation and the like) and expressing uncertainty in determination by using a reliability therefor as a parameter, a technique for executing setting by using an empirical equation, or the like. Therefore, the method for setting m(A) is not limited to this technique.

Map information included in a node i is a set of BBAs of a point represented in logical expression 3 included in each section.

$$x \in F \quad \text{[Logical expression 3]}$$

In logical expression 3,
[Variable 4]
F
is an entire field. Hereinafter, when especially indicating a value determined from a measurement result Z is indicated, a support m(A) is expressed as expression 5.

$$m_i^X[Z](A) \quad \text{[Expression 5]}$$

Expression 5 is expressed as $m_i$ in an abbreviation form when it is unnecessary to express a subset A of a specific hypothesis, a measurement result Z, and a position X.

Next, by using a flat network structure as an example, a method for integrating map information in the integration unit 204 is described.

It is assumed that each node forms a network represented by a graph G=(V, E). Herein, V is a node set and E is an edge set. Further, it is assumed that each edge is bidirectional. In general, in the following discussion, even when varying with time, the graph G may be jointly connected (a union of a graph G(t) in which an edge set E varies with time is connected). However, for description simplification, it is assumed that the graph G is time-invariant and is connected. When a graph G is provided, adjacent nodes of each node are determined. At that time, a set of adjacent nodes of a node i is designated as Vi.

The integration unit 204 realizes the same result (totally-integrated map information) as information in which pieces of information of all nodes are integrated by repeating an update from map information of the own node and map information of an adjacent node to map information integrated them by node i. Thereby, all nodes can include the same totally-integrated map information.

Herein, integration of map information indicates that map information of the own node and map information of an adjacent node are joined in accordance with the Dempster joint rule in which the above-described BBA is not normalized. In the Dempster joint rule in which normalization is not executed, when there are two pieces of map information $m_1$ and $m_2$, integrated map information m thereof is defined as equation (2) represented by following equation 6.

[Equation 6]

$$f \text{ or } A \subseteq \Omega, m(A) = (m_1 \oplus m_2)(A) \triangleq \Sigma_{B \cap C = A} m_1(B) m_2(C) \quad (2)$$

Note that
[Operator 7]
$\oplus$ represents a Dempster joint that is not normalized. Map information m integrated in such a manner is information having an information amount more than $m_1$ and $m_2$ by themselves. This indicates that when a support (probability) of a subset A in a hypothesis for a certain point is considered, reliability is higher in a case where it is determined that independent two nodes are equally probable than in a case where it is determined that one node is probable. The above-described integration is a technique for quantitatively calculating a reliability for a subset A in all hypotheses. When a value is set in relation with a singleton hypothesis as described above, a result of the integration is completely the same result as in integration by using the Bayesian estimation.

Further, a point that the BBA is superior to a technique using a probability as in the Bayesian estimation or the like is that a fact that there is no information can be expressed by using a special BBA as in conditional equation (3) represented in following expression 8.

[Expression 8]

$$m(A) = \begin{cases} 1 & A = \Omega \\ 0 & \text{(otherwise)} \end{cases} \quad (3)$$

The special BBA is referred to also as a vacuous belief function and hereinafter is referred to as a unit BBA and represented as $1_D$. When the unit BBA is used, a setting problem of a prior probability in the Bayesian estimation can be avoided. For example, for a point (position) of an outside of a measurement range
[Variable 9]
$F_i$
of a node i, the integration unit 204 includes no information before integration and therefore uses, in the Bayesian estimation, a value of ½ as a prior probability. On the other hand, the integration unit 204 may use $1_D$ in the DS theory or TBM.

Totally-integrated map information $m_{total}$ in which pieces of map information $m_1$ included in all nodes are integrated indicates that, for all points being logical expression 10
[Logical Expression 10]

$$x \in F_i$$

equation (4) represented in equation 11
[Equation 11]

$$m_{total}{}^x(A) = \oplus_{i \in V} m_i{}^x \quad (4)$$

is calculated. Herein,
[Operator 12]
$\oplus_{i \in V}$
represents expression 14 which is executed a not normalized Dempster joint, which is represented in following operator 13, of the equation (2) for all nodes in a node set V (wherein $|V|=N$).

[Operator 13]
$\oplus$ $$m_1{}^x \oplus \ldots \oplus m_N{}^x \quad \text{[Expression 14]}$$

In other words, in the integration unit 204, when a result acquired by acquiring or updating map information of a k-th time in each node i is designated as $m_i(k)$, convergence to $m_i(k) \to m_{total}$ is an object with respect to k=1, 2, ... in all nodes i. Herein, the symbol k of $m_i(k)$ is a number indicating a number of times of repetition of acquisition or update of map information from an adjacent node.

Hereinafter, a technique in which by using sequential integration processing (repetition of processing of acquiring map information from an adjacent node, integrating the acquired map information with map information of the own node, and executing updating), pieces of map information included in all nodes are converged to $m_{total}$ is specifically described.

First, a case in which the number of all connected nodes in a system is known (N units) and a failure or the like is not occurring is considered.

In an average consensus method, it is assumed that N nodes configure a connected network. The average consensus method repeats processing of updating $a_i$ while exchanging with an adjacent node, for a scalar or vector amount $a_i$ included in a node i. Therefore, the average consensus method is a technique in which all $a_i$s are converged to an arithmetical average $\langle a \rangle = (a_1 + \ldots + a_N)/N$ (see NPL 2). Update processing in a number of times of repetition t+1 is given as equation (5) represented in following equation 15
[Equation 15]

$$a_i(t+1) = w_{i,i} a_i(t) + \Sigma_{j \in V_i} w_{i,j} a_j(t) \quad (5)$$

wherein $V_i$ is an adjacent node set of a node i and $W_{i,j}$ is a weighting coefficient. As one method for weight setting, there is conditional equation (6) represented in following equation 16

[Expression 16]

$$w_{i,j} = \begin{cases} \dfrac{1}{\max\{d_i, d_j\} + 1} & \text{if } (j, i) \in E \\ 1 - \sum_{j \in V_i} w_{i,j} & \text{if } i = j \\ 0 & \text{otherwise} \end{cases} \quad (6)$$

wherein (i, j) is an edge for connecting a node i and a node j, E is an edge set, and $d_i$ is a current degree (the number of adjacent nodes).

At that time, it is known that, when the integration unit 204 repeats update processing in accordance with equation (5), all $a_i$s are converged to an arithmetic average of initial values as in equation (7) represented in following Equation 17

[Equation 17]

$$\lim_{t \to \infty} a_i(t) = \frac{1}{N}(a_1(0) + \ldots + a_N(0)) = \frac{1}{N} \sum_{i \in V} a_i(0) \quad (7)$$

wherein V is a node set. When an arithmetic sum "+" of above equation (7) can be transformed to

[Operator 18]

⊕ the integration unit 204 can converge, in case which N is known, N×$m_i$ to $m_{total}$ of equation (4). Hereinafter, the technique is described.

When m of any BBA is given, a commonality function q corresponding to a one-on-one basis always exists. And, q=Ψ(m) and inverse transform m=Ψ$^{-1}$(q) for transforming both m and q exist as equations (8) and (9), respectively, represented in following expression 19

[Expression 19]

$$\Psi: M \to Q, \text{ for } A \subseteq \Omega, q(A) = \Sigma_{A \subseteq B} m(B) \quad (8)$$

$$\Psi^{-1}: Q \to M, \text{ for } A \subseteq \Omega, m(A) = \Sigma_{B \supseteq A}(-1)^{|B|-|A|} q(B) \quad (9)$$

wherein M is a set of all assumed ms and Q is a set of all assumed qs.

The integration unit 204 transforms a BBA to a logarithmic-commonality function lq as in equation (10) represented in following equation 20, by using transform Φ defined as described below.

[Equation 20]

$$\Phi: M \to LQ, \text{ for } A \subseteq \Omega, lq(A) = \ln q(A) = \ln \Sigma_{A \subseteq B} m(B) \quad (10)$$

LQ is a set in which values for each subset A of all assumed qs are subjected to natural logarithm ln calculation. In this case, a integration operation defined by above equation (2) for any $m_1$ and $m_2$

[Operator 21]

⊕ is an operation in which an exponential function of an arithmetic sum is inversely transformed as in equation (11) represented in following equation 22.

[Equation 22]

$$m_1 \oplus m_2 = \Psi^{-1}(q): \text{ for } A \subseteq \Omega, q(A) = \exp(lq_1(A) + lp_2(A)) \quad (11)$$

Therefore, when the average consensus method is applied to a logarithmic-commonality function and an exponential function thereof is calculated lastly, a commonality function expression $q_{total}$ of totally-integrated map information is acquired as equation (12) represented in following equation 23.

[Equation 23]

$$\text{for } A \subseteq \Omega, q_{total}(A) = \lim_{t \to \infty} \exp(N\ lq_i(A)(t)) \quad (12)$$

Further, when $Q_{total}$ is inversely transformed, the integration unit 204 can determine totally-integrated map information by using equation (13) represented in following equation 24.

[Equation 24]

$$m_{total} = \Psi(q_{total}) \quad (13)$$

In above conditional equation (6), degrees of not only the own node but also an adjacent node are needed. When a network is not changed, a degree of an adjacent node may be acquired once. However, in general, it is preferable to also acquire, in addition to a logarithmic-commonality function of an adjacent node, a degree of a current adjacent node at the same time.

Up to this point, it is assumed that there is neither a node failure nor a link failure and the number N of communicable nodes is known. However, when N varies according to occurrence of a failure and the like, N of above equation (12) is not the number of nodes of the entire system but is the number (designated as N') of (active) nodes being currently operating normally and is an unknown. Therefore, it is necessary to estimate N'. Hereinafter, a technique therefor is described.

First, the integration unit 204 prepares another network channel that executes an average consensus method and sets a scalar amount S in each node. A scalar amount S at a time t of a node i is represented as $S_i(t)$.

In a first estimation method for a number of active nodes, the integration unit 204 sets $S_i(0)=1$ as an initial value for any one node (designated as i) of all nodes and sets $S_j(0)=0$ for nodes (designated as j) other that this node.

In this case, as a result of execution of the average consensus method, a scalar amount $S_j(t)$ for all nodes i=1, ..., N is converged to 1/N'. However, N' is the number of nodes currently connected, and is N−Q which is subtracted the number Q of nodes that are not communicable based on a failure or the like from the number N of all nodes. Therefore, the integration unit 204 can estimate N' when calculating a reciprocal number $1/S_i(\infty)$ of a convergence value of $S_j(t)$.

In this method, when a node i of $S_j(0)=1$ fails, an initial value $S_j(0)$ of a scalar amount S for all nodes other than the node i is 0 and a convergence value thereof is also 0, and therefore it is difficult for the integration unit 204 to determine N'. Therefore, in a second estimation method for a number of active nodes, the integration unit 204 randomly selects a node i to be set as $S_i(0)=1$ every time. In this case, unless a failure node and a node i set as $S_i(0)=1$ coincide with each other by chance, the integration unit 204 can determine N'.

Further, a third estimation method for a number of active nodes is a technique in which a set U including K nodes is considered and $S_i(0)=1$ is set for a node i∈U belonging to the set U. In this case, when, for example, an average failure rate (being a ratio of an average number of failure nodes to the whole and settable, for example, from a mean time failure and the like) is designated as R, an expected value of the number of nodes that fail by chance is K×R among K nodes belonging to U.

Therefore, an initial value is 1 for (1−R)×K nodes among the nodes belonging to U, and among nodes other than these, an initial value is 0 for (1−R)×(N−K) nodes that operate. Therefore, a convergence value of $S_i(t)$ of each node i is

[Equation 25]

$$\lim_{t \to \infty} S_i(t) = \frac{(1-R)K}{(1-R)N} = \frac{K}{N}.$$

By multiplying a reciprocal number of a convergence value by (1−R)×K, the integration unit 204 can determine an estimated value (1−R)×N of N' as equation (14) represented in following equation 26.

[Equation 26]

$$N' = \frac{(1-R)K}{\lim_{t \to \infty} S_i(t)} \quad (14)$$

Therefore, even when there is no knowledge about N, the integration unit 204 can acquire a number of currently active nodes when an average failure rate R and the number K of nodes belonging to a set U of nodes in which a present initial value is 0 are found.

This technique is not always applicable only to a node failure but also is applicable, for example, to a case in which a node is added or eliminated and can estimate a number N' of active nodes, without modifying setting for an existing node.

Further, as another method for estimating a number N' of active nodes, a technique that focuses attention on the number of edges is described.

It is assumed that the number N of all nodes is known and it is known that a degree distribution of nodes is a Poisson distribution of an average k.

A node i∈U stores the number of currently active (communicable) adjacent nodes on $S_i(0)$. In this case, the integration unit 204 applies a convergence value $S_i(\infty)$ to equation (15) represented in following equation 27 and thereby can estimate a number N' of currently active nodes.

[Equation 27]

$$N' = N\frac{\lambda}{2\lambda - S_i(\infty)} \qquad (15)$$

Figure 3:
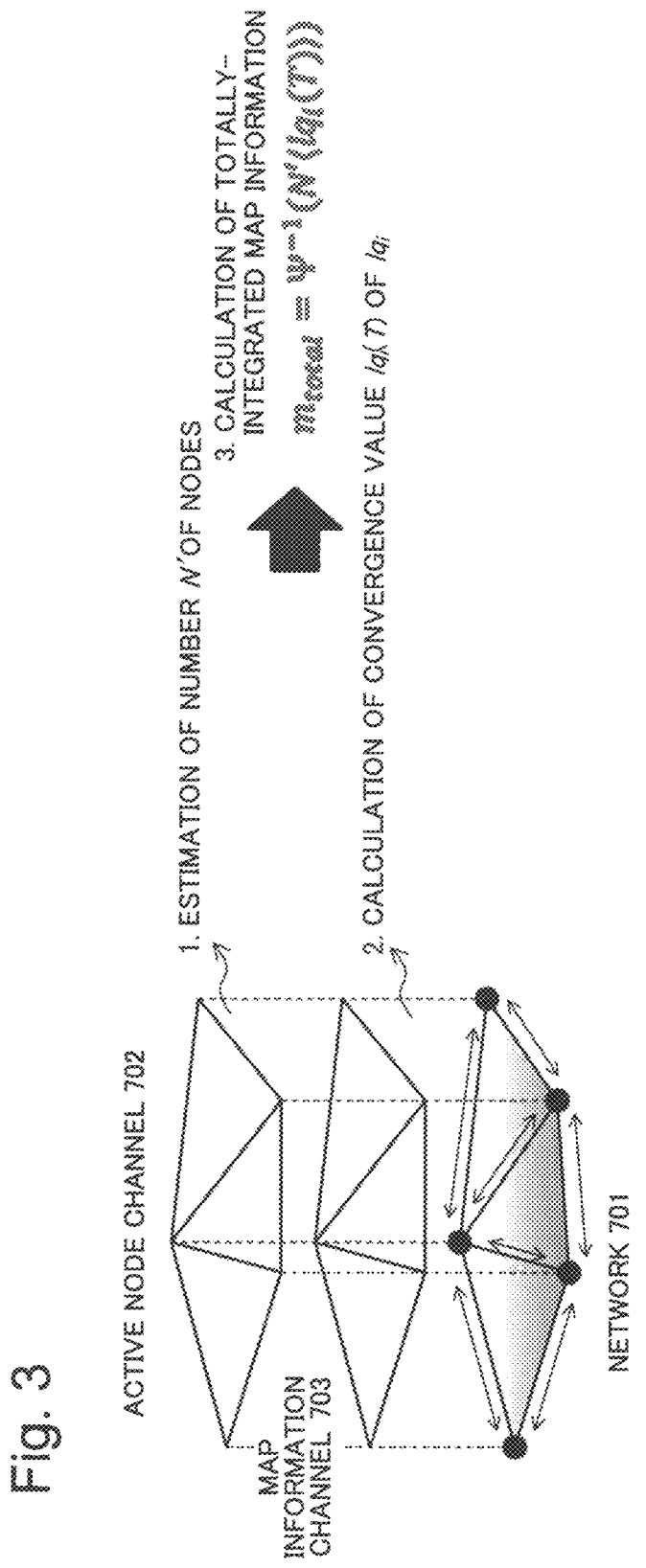
FIG. 3 is a schematic diagram illustrating one example of a channel configuration and processing used in integration processing in the distributed-cooperative-information-processing device illustrated in FIG. 2.

Next, a technique for integrating pieces of map information included in all active nodes by using above equation (4) in the integration unit 204 is described by using FIG. 3.

FIG. 3 is a schematic diagram illustrating one example of a channel configuration and processing used in integration processing in the distributed-cooperative-information-processing device illustrated in FIG. 2.

Herein, by using the above-described third estimation method for estimating a number of active nodes, $S_i(0)=1$ is preset for K nodes, and $S_i(0)=0$ is preset for nodes other than these.

First, as illustrated in FIG. 3, the integration unit 204 of a node i sets, on a network 701, an average consensus network (hereinafter, referred to as an active node channel) 702 for estimating a number (N') of active nodes. Further, the integration unit 204 sets an average consensus network (hereinafter, referred to as a map information channel) 703 for integrating map information. The integration unit 204 respectively initializes them. Specifically, the integration unit 204 sets a setting value of $S_i(0)$ in which the number of times of repetition is 0 as an initial value for the active node channel 702. The integration unit 204 sets, as an initial value for the map information channel 703,

[Function 28]

$lq_i^x(0)$ in which map information is transformed to logarithmic-commonality information. Herein,

[Function 29]

$lq_i^x(0)$ is a logarithmic-commonality function of a point $x \in F_i$  [Logical expression 30]

at a time 0. The logarithmic-commonality function is equation (16) represented in following equation 31 with respect to a subset $A \subseteq \Omega$.

[Equation 31]

$$lq_i^x(0) = \Phi(m_i^x(0)) \qquad (16)$$

The integration unit 204 of the node i acquires, by using the adjacent management unit 203 and the communication unit 202, the following information from an adjacent node j∈$V_i$ managed by the adjacent management unit 203 at a number T of times of repetition. This information includes the number $d_j(t)$ of currently active adjacent nodes, a value $S_j(t)$ of an active node channel, and logarithmic-commonality information 100.

The integration unit 204 updates $S_j(t)$ and 100 in accordance with equation (5). This is repeated at a predetermined number T of times of repetition, and thereby the integration unit 204 acquires a value $S_j(T)$ (from this value, N' can be determined) of the active node channel 702 and logarithmic-commonality information $lq_j(T)$. The number T of times of repetition may be preset in the integration unit 204. Alternatively, the integration unit 204 may monitor a change amount from a last time and terminate processing when a value equal to or less than a preset change amount is reached.

The integration unit 204 determines, from the value $S_j(T)$ of the active node channel 702 and the logarithmic-commonality information $lq_j(T)$ acquired in this manner, an estimated amount

[Variable 32]

$\hat{m}_i$ of totally-integrated map information $m_{total}$ by using equation (17) represented in following equation 33.

[Equation 33]

$$\hat{m}_i = \Psi^{-1}\left(\frac{(1-R)Klq_i(T)}{S_i(T)}\right) = \Psi^{-1}(N' \times \langle lq_i(T) \rangle) \qquad (17)$$

Based on the first example embodiment, by integrating pieces of estimate determination information relating to an environment estimated by each node from measurement results by using the Bayesian estimation, the DS theory, or TBM with a distributed technique, a centralized server becomes unnecessary. Therefore, a single point of failure of a system is eliminated and thereby failure tolerance is increased.

Further, because of integrating estimate determination information with estimating a number of currently active nodes by active nodes, the first example embodiment achieves an advantageous effect that even when there is a node failure or the like, estimate determination processing can be stably executed.

The reason is as follows. The measurement and detection unit 206 measures an environment by using a sensor device. The estimate computation unit 205 generates estimate determination information that is information indicating a probability of a hypothetical set of states in the environment, based on a measurement result of the environment. The communication unit 202 receives estimate determination information generated by another distributed-cooperative-information-processing device within a field. The adjacent management unit 203 manages information of another distributed-cooperative-information-processing device. The integration unit 204 integrates the estimate determination information generated by the own device and the estimate determination information received from another distributed-cooperative-information-processing device. In this manner, the distributed-cooperative-information-processing device 200 generates information in which estimate determination information based on a measurement result of an environment and an estimate determination of an adjacent device are integrated.

Figure 10:
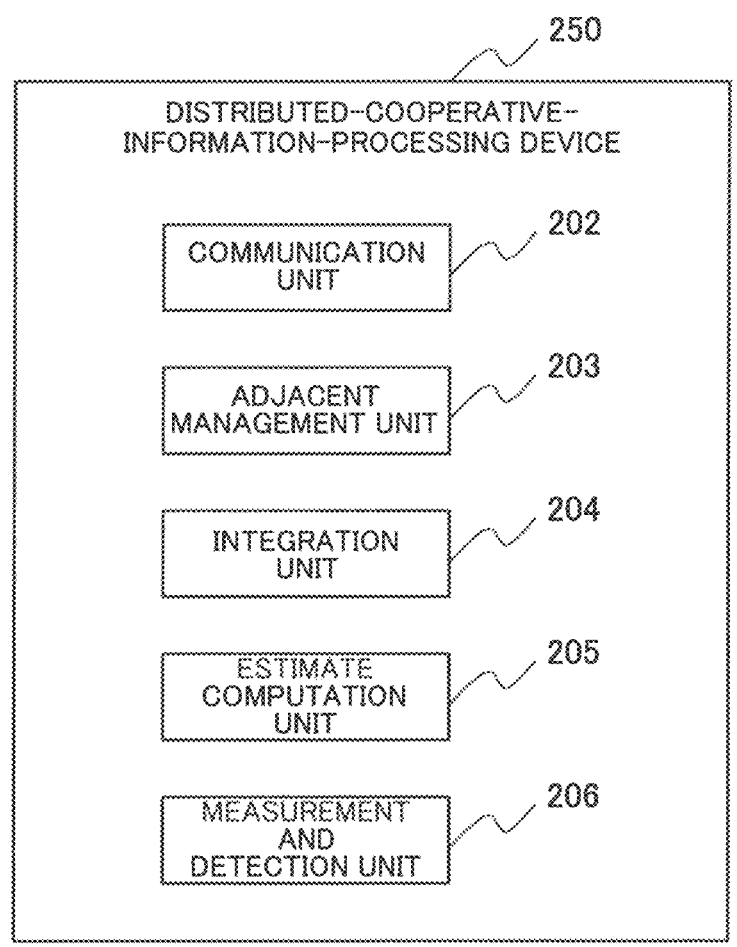
FIG. 10 is a block diagram illustrating an outline of the first example embodiment.

In other words, an outline of the first example embodiment is as follows. FIG. 10 is a block diagram illustrating a configuration of a distributed-cooperative-information-processing device 250 that is an outline of the first example embodiment.

The distributed-cooperative-information-processing device 250 is allocated in a distributed manner within a predetermined field. The distributed-cooperative-information-processing device 250 includes the measurement and detection unit 206, the estimate computation unit 205, the communication unit 202, the adjacent management unit 203, and the integration unit 204. The measurement and detection unit 206 measures an environment by using a sensor device. The estimate computation unit 205 generates estimate determination information that is information indicating a probability of a hypothetical set of states in the environment, based on a measurement result of the environment. The communication unit 202 receives estimate determination information generated by another distributed-cooperative-information-processing device within a field. The adjacent management unit 203 manages information of another distributed-cooperative-information-processing device. The integration unit 204 integrates the estimate determination information generated by the own device and the estimate determination information received from another distributed-cooperative-information-processing device.

The distributed-cooperative-information-processing device 250 produces an advantageous effect similar to the advantageous effect of the distributed-cooperative-information-processing device 200. The reason is that each component included in the distributed-cooperative-information-processing device 250 operate, similarly to the component included in the distributed-cooperative-information-processing device 200. The distributed-cooperative-information-processing device 250 is a minimum configuration of the first example embodiment.

Second Example Embodiment

Next, a second example embodiment of the present invention is described by using the drawings.

Figure 4:
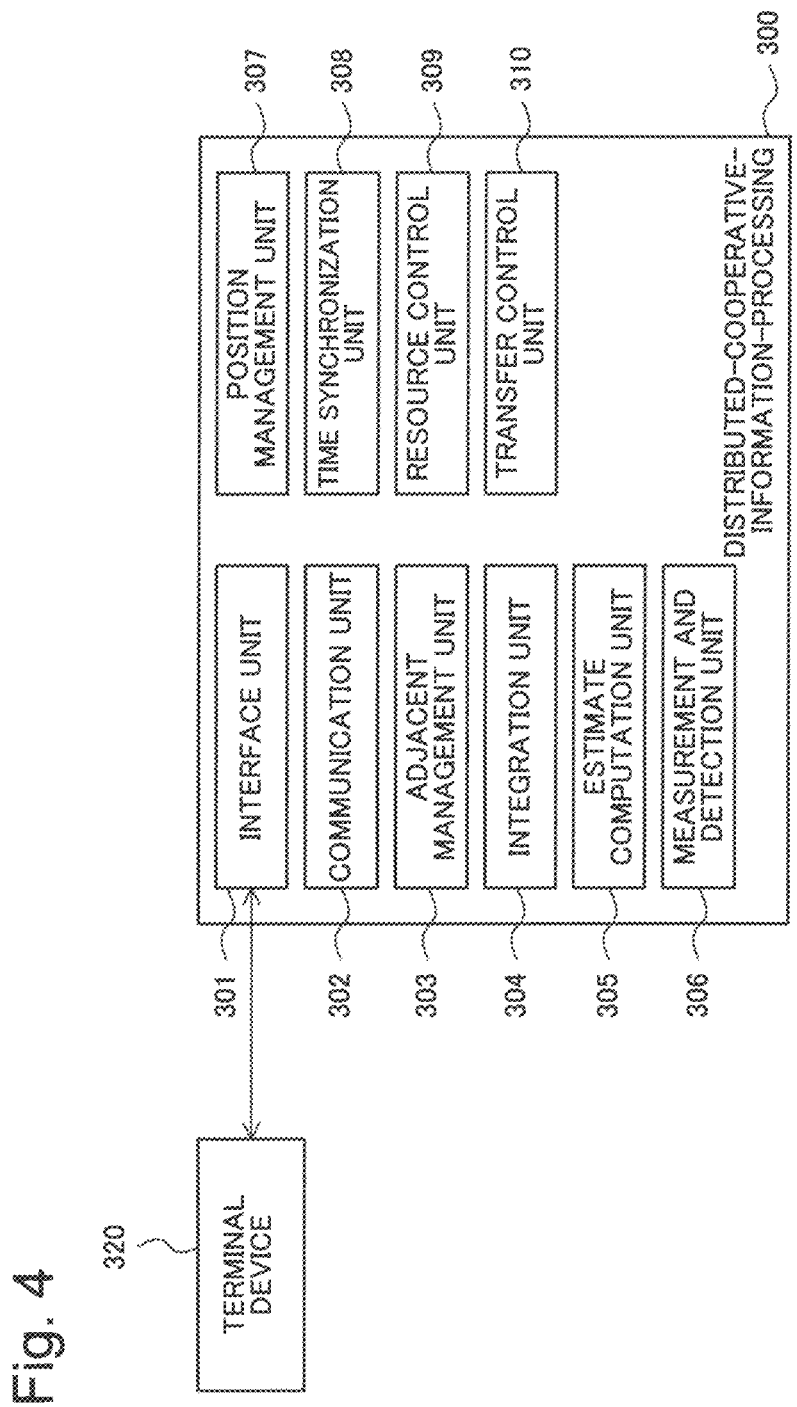
FIG. 4 is a block diagram illustrating one configuration example of a distributed-cooperative-information-processing device according to a second example embodiment.

FIG. 4 is a block diagram illustrating one configuration example of a distributed-cooperative-information-processing device according to the second example embodiment. A configuration of a distributed-cooperative-information-processing system is similar to the first example embodiment illustrated in FIG. 1, and therefore description thereof is omitted here.

As illustrated in FIG. 4, a distributed-cooperative-information-processing device 300 of the second example embodiment includes an interface unit 301, a communication unit 302, an adjacent management unit 303, an integration unit 304, an estimate computation unit 305, and a measurement and detection unit 306. Further, the distributed-cooperative-information-processing device 300 includes a position management unit 307, a time synchronization unit 308, a resource control unit 309, and a transfer control unit 310.

The interface unit 301, the communication unit 302, and the adjacent management unit 303 included in the distributed-cooperative-information-processing device 300 of the second example embodiment are configured to include functions similar to the functions of the interface unit 201, the communication unit 202, and the adjacent management unit 203 illustrated in FIG. 1. Further, the integration unit 304, the estimate computation unit 305, and the measurement and detection unit 306 included in the distributed-cooperative-information-processing device 300 of the second example embodiment are configured to include functions similar to the functions of the integration unit 204, the estimate computation unit 205, and the measurement and detection unit 206 illustrated in FIG. 1.

The time synchronization unit 308 mutually synchronizes times indicated by timers (not illustrated) included in nodes, respectively. The time synchronization unit 308 may use, for example, well-known Network Time Protocol (NTP) or Flooding Time Synchronization Protocol (FTSP) for time synchronization. All nodes operate synchronously based on processing for time synchronization in the time synchronization unit 308.

The position management unit 307 manages position information of the own node acquired by being measured or reported. The position management unit 307 manages position information of the own node measured, for example, by using a global positioning system (GPS). In the above-described first example embodiment, description has been made, assuming that a position of each node is known. However, in the second example embodiment, the position management unit 307 included in nodes, respectively, acquire position information.

The position management unit 307 can also determine position information of the own node from a plurality of information sources in which positions thereof are known. A case in which, for example, times of each node are synchronized by using the time synchronization unit 308 is as follows. That is, the position management unit 307 can identify, when being able to receive information capable of measuring a distance such as a radio wave or a sound wave emitted from a node in which a position thereof is unknown in at least four known locations in a three-dimensional space, the position.

When a node j of a known position $(x_j, y_j, z_j)$ receives a signal emitted from a node of an unknown location $(x, y, z)$ and propagated at a velocity v at an unknown time t, equation (18) represented in following equation 34 is satisfied.

[Equation 34]

$$(x-x_j)^2+(y-y_j)^2+(z-z_j)^2=v^2(t-t_j)^2 \tag{18}$$

The reason why a transmission time is assumed to be an unknown is that times of nodes are not always synchronized strictly. Therefore, when there are pieces of measurement information in at least four different points in which positions are known, the position management unit 307 can determine an unknown (x, y, z, t).

Further, when there are five or more pieces of measurement information, above equation (18) is calculated for each of two different nodes j (for k=1, ..., K, $j_k$ and $j_{k+1}$ are designated), and thereby the position management unit 307 can acquire K equations with respect to an unknown (x, y, z, t). These K equations are equations (19) represented in following equation 35.

[Equation 35]

$$-2(x_{j_k}-x_{j_{k+1}})x-2(y_{j_k}-y_{j_{k+1}})y-2(z_{j_k}-z_{j_{k+1}})z+ \\ 2v^2(t_{j_k}-t_{j_{k+1}})t=-x_{j_k}^2+x_{j_{k+1}}^2-y_{j_k}^2+y_{j_{k+1}}^2-z_{j_k}^2+z_{j_{k+1}}^2+ \\ v^2(t_{j_k}^2-t_{j_{k+1}}^2) \tag{19}$$

Equation (19) can be expressed by using following algebraic equation (20) when it is assumed that (x, y, z, t) is a four-dimensional vector $r=(x, y, z, t)^T$.

$$Ar=b \tag{20}$$

wherein a matrix A is a matrix of K rows and four columns, a vector b is a K-dimensional vector, and respective k-row components are represented by using equations (21) and (22) represented in following equations 36.

[Equation 36]

$$A_{k^+} = (x_{j_k} - x_{j_{k+1}}, y_{j_k} - y_{j_{k+1}}, z_{j_k} - z_{j_{k+1}}, v^2(t_{j_k} - t_{j_{k+1}}))$$  (21)

$$b_k = \frac{1}{2}[x_{j_k}^2 - x_{j_{k+1}}^2 + y_{j_k}^2 - y_{j_{k+1}}^2 + z_{j_{k+1}}^2 - z_{j_{k+1}}^2 - v^2(t_{j_k}^2 - t_{j_{k+1}}^2)]$$  (22)

A four-dimensional vector r of an optimum solution in which a square error of algebraic equation (20) is minimized is determined by using a Moore-Penrose inverse matrix of a matrix A represented in variable 37 when equation (23) represented in following equation 38 is used.
[Variable 37]
$A^+$
[Equation 38]

$$r = A^+ b \quad (23)$$

A solution of equation (23) is a least-squares basis and is commonly more accurate as the number of K increases.

As a method for executing position measurement and management as described above, there is a method in which a plurality of nodes measured of its position or a plurality of nodes mounted with a GPS are previously included in a system, and the position management unit 307 executes the above-described sequential position measurement and position identification.

When the position management unit 307 uses a node identified its position from at least five nodes positions of which are known as a node whose position is known used for position measurement of a next node, the number of nodes whose positions are known is increased. Therefore, it is expected that pieces of measurement information are increased and accuracy of position measurement of a node thereafter is enhanced. Further, by repeatedly measuring the position again at the node whose position has been already measured with the node whose position is specified as the known node in that way, an advantageous effect that accuracy is further enhanced is achieved.

Further, a technique in which a mobile machine mounting a GPS and being capable of acquiring position information transmits a signal such as a radio wave or a sound wave capable of executing distance measurement in a plurality of positions while moving a periphery of a nod, is conceivable. In this case, it is preferable that the mobile machine preferably transmits a signal from various positions as much as possible. In this case, the position management unit 307 of a node can identify a position of the own node by executing the above-described calculation with a transmission time and position coordinates of the own node as unknown numbers, based on transmission coordinates of a signal acquired from the mobile machine and a reception time thereof.

A position of the own node is necessary upon transforming the above-described map information from relative coordinates to absolute coordinates. For example, with regard to position information acquired from reflection of a radio wave as in a radar, only relative coordinates in which a node is an origin are found. Therefore, transformation from a position of a node to an absolute position is executed, and thereby the node can integrate the position with map information of an adjacent node.

The resource control unit 309 controls, based on totally-integrated map information acquired in the integration unit 304, a resource use state of the own node. For example, upon randomly installing each node, when the number of installation of nodes is coarse or dense due to a topographical reason or the like or when it is difficult to execute measurement with high quality or communication between nodes with high accuracy due to an interference radio wave, a shielding material, or the like, the following control is necessary. That is, in order to generate totally-integrated map information by using a small resource use amount while ensuring measurement quality of equal to or more than a predetermined level, resource control according to an environment is necessary.

Further, in a location where there are a small number of nodes, an information amount decreases, and therefore quality commonly decreases. In a location where there are an excessive number of nodes, there is an information amount more than necessary, and therefore it is highly possible that excessive quality results. The resource control unit 309 dynamically adjusts quality by modifying a resource use state in a node. Note that the quality indicates, for example, a reliability of acquired totally-integrated map information and the like.

For example, it is assumed that, in order to reduce power consumption, a node executes intermittent operations where an operation state and a sleep state are repeated. In this case, while more information can be acquired at a shorter operation interval, power consumption is increased and a use capacity of a storage device is increased. Therefore, the resource control unit 309 increases an operation interval, based on totally-integrated map information, when quality of a measurement area assigned to the own node is higher than quality of a measurement area assigned to another node. Further, the resource control unit 309 decreases an operation interval when quality is lower. In this manner, the resource control unit 309 adjusts non-uniformity of quality of the entire map generated based on a distribution of nodes by modifying a resource use state.

Quality in, for example, a point $$x \in F \quad \text{[Logical expression 39]}$$

can be measured by a magnitude of
[Function 40]
$\hat{m}_i^x(\Omega)$
in an estimated amount of totally-integrated map information acquired by above equation (17).
$\Omega = \{\omega_1, \omega_2\}$ is an amount indicating "nothing is found". When amount of
[Function 41]
$\hat{m}_i^x(\Omega)$
is large, it is indicated that information for determining which one of hypotheses $\omega_1$ or $\omega_2$ is correct is lacking.

Therefore, when amount of $$\hat{m}_i^x(\Omega) \quad \text{[Math. 42]}$$

relating to a point in a measurement area assigned to the own node is larger compared with another node, it is effective that use control of a resource such as decreasing an operation interval is executed. Other than this, there is resource control such as modifying measurement performance in the measurement and detection unit 306 or a frequency of communication with an adjacent node. For example, in the case of a radar, it is conceivable that a reaching distance is increased by increasing transmission power of a radio wave and thereby detection accuracy is increased.

In general, quality increases when a resource use amount of a node increases. Therefore, the resource control unit 309 may control a resource use state in order to improve a resource use state from current quality to desired quality or correct variations in quality for each area or point, and is not limited to the above examples.

Further, the resource control unit 309 can also use, as a definition of quality, instead of above-described

[Function 43]

$\hat{m}_i^x(\Omega)$

[Function 44]

$\hat{m}_i^x(\phi)$.

An empty set

[Logical symbol 45]

$\phi$ indicates a magnitude of an opinion conflict and indicates that measurement values of a plurality of nodes are conflicting. This indicates that it is conceivable that measurement accuracy is decreased due to any cause. Therefore, it is conceivable that, for example, a node assigned to a point where

[Function 46]

$\hat{m}_i^x(\phi)$ is large increases transmission power of a radio wave for in such a way as to be able to acquire more accurate information and the like.

The transfer control unit 310 suppresses transmission and reception of information between nodes. The transfer control unit 310 controls the communication unit 302, for example, in such a way as to transmit and receive estimate determination information of an adjacent node including a measurement result at the same point as in a measurement result in the measurement and detection unit 306. In a distributed-cooperative-information-processing system, it is conceivable that all nodes do not need to know information of at least some other nodes. A case in which, for example, in a vast field, a large number of nodes are allocated in a distributed manner and probability information (the map information) in which an obstacle exists in each point of the field is generated is considered. In such a case, depending on an application, it may be unnecessary for a node allocated at one end of a field to know map information measured by a node allocated at the other end that is faraway. Update processing for integration represented in above equations (5) and (11) is executed independently for each node. Therefore, in principle, an integration result in a node at a certain point does not affect an integration result in a node at the other node. Therefore, in principle, a plurality of nodes that need information at the same point may share information of the point. These nodes may not necessarily process or receive unnecessary information.

Therefore, the transfer control unit 310 presets an interest area or point where map information is necessary and constructs a logical overlay network for each piece of necessary information on a physical network. In this case, the transfer control unit 310 selects an overlay network according to map information to be exchanged. As a result, in each node, information unnecessary for the above-described integration processing is not used. Therefore, each node can omit needless calculation processing.

Further, each node transmits and receives necessary information via an overlay network, and thereby information transfer unnecessary in a physical network can be reduced. Herein, in order to cope with a dynamic increase and decrease of nodes, for each overlay network, nodes may execute, at the same time, the above-described estimation processing for a number of active nodes. An overlay network may be constructed in such a way that all nodes that need information of a related interest area or point are connected.

The terminal device 320 is a device for acquiring information from the distributed-cooperative-information-processing device 300 and provides map information to a user by displaying map information managed by the distributed-cooperative-information-processing device 300.

Specifically, by using display for using each component value of the above-described estimated value

[Variable 47]

$\hat{m}_i^x$ of totally-integrated map information, a user can more effectively interpret a current situation.

Hereinafter, by using a radar as an example, an example in which whether or not a target exists is displayed by using map information is described.

In display of a general existence probability, an estimated value

[Variable 48]

$\hat{m}_i^x$ may be transformed to a value indicating a probability. As this display, for example, there is a Pignistic Transformation method. This is a technique for transforming an estimated amount $$\hat{m}_i^x \qquad \text{[Math. 49]}$$

defined for all subsets $A \subseteq \Omega$ of a hypothetical set $\Omega=\{\omega_1, \ldots, \omega_H\}$ (the number of hypotheses is designated as H) to a degree of definition only for elements (a singleton hypothesis) of the hypothetical set. In this technique, a probability is defined for any BBA and m by equation (24) represented in following equation 50.

[Equation 50]

$$P(\omega_i) \sum_{\omega_i \in B} \frac{m(B)}{(1-m(\phi))|m(B)|} \qquad (24)$$

When, for example, $\Omega=\{\omega_1, \omega_2\}$, equation (24) becomes

[Math. 51]

$$P(\omega_1) = \frac{m(\omega_1)+m(\Omega)/2}{(1-m(\phi))}$$

Herein, a visual information display method using a value indicating an existence probability of a target at each point based on equation (24) is referred to as "standard display information". The standard display information indicates that when any hypothesis is selected in a hypothetical set, which hypothesis has how much existence probability of a target to what extent. Therefore, the standard display information may be regarded as the most standard information. Specifically, heat map display using a value indicating a probability of a certain selected hypothesis $\omega_1$ with respect to hypotheses of a presence or absence of a target and the like at each point in a radar system or the like is a typical display example of standard display information. However, the standard display information is not limited thereto.

However, on the other hand, standard display information does not completely use information of a subset of a hypothetical set other than a singleton hypothesis. As described above, for example,

[Function 52]

$\hat{m}_i^x(\phi)$ indicates a magnitude of an opinion conflict. However, in equation (24), a hypothesis is renormalized, and therefore an amount thereof is not reflected. Information of a point where an opinion conflict is large is unreliable information. For example, in a mode for displaying a point having higher accuracy with respect to a present or absence of a target, it is possible not to display a point having a predetermined amount or more of

[Function 53]

$\hat{m}_i^x(\phi)$.

Similarly,

[Function 54]

$\hat{m}_i^x(\Omega)$ indicates that there is no knowledge and indicates a degree in which it is difficult to say whether there is an obstacle. Therefore, the terminal device 320 may execute processing for removal from a display target or the like at a predetermined amount or more.

In this case, a user can preferably select display according to accuracy of information. The user can discriminate, based on the selection of accuracy, display having higher accuracy from display that is not so accurate even when probabilities calculated by equation (24) are the same.

When being based on the second example embodiment, an advantageous effect similar to the advantageous effect of the first example embodiment can be produced, and each node acquires respective pieces of position information by using the position management unit 307. All nodes can acquire not only an observable range of the own device but also the entire estimate determination information, based on position information. Therefore, by using the resource control unit 309 using the result, each node autonomously changes a resource use state. Based on the change of the resource use state, each node can maintain estimation quality in a measurement target range at a predetermined level or higher.

While the present invention is described with reference to example embodiments, the present invention is not limited to these example embodiments. The constitution and details of the present invention can be subjected to various modifications that can be understood by those of ordinary skill in the art without departing from the scope of the present invention.

First Specific Example

Next, by using a distributed small-sized radar system 400 as an example, a first specific example of the present invention is described by using drawings.

Figure 5:
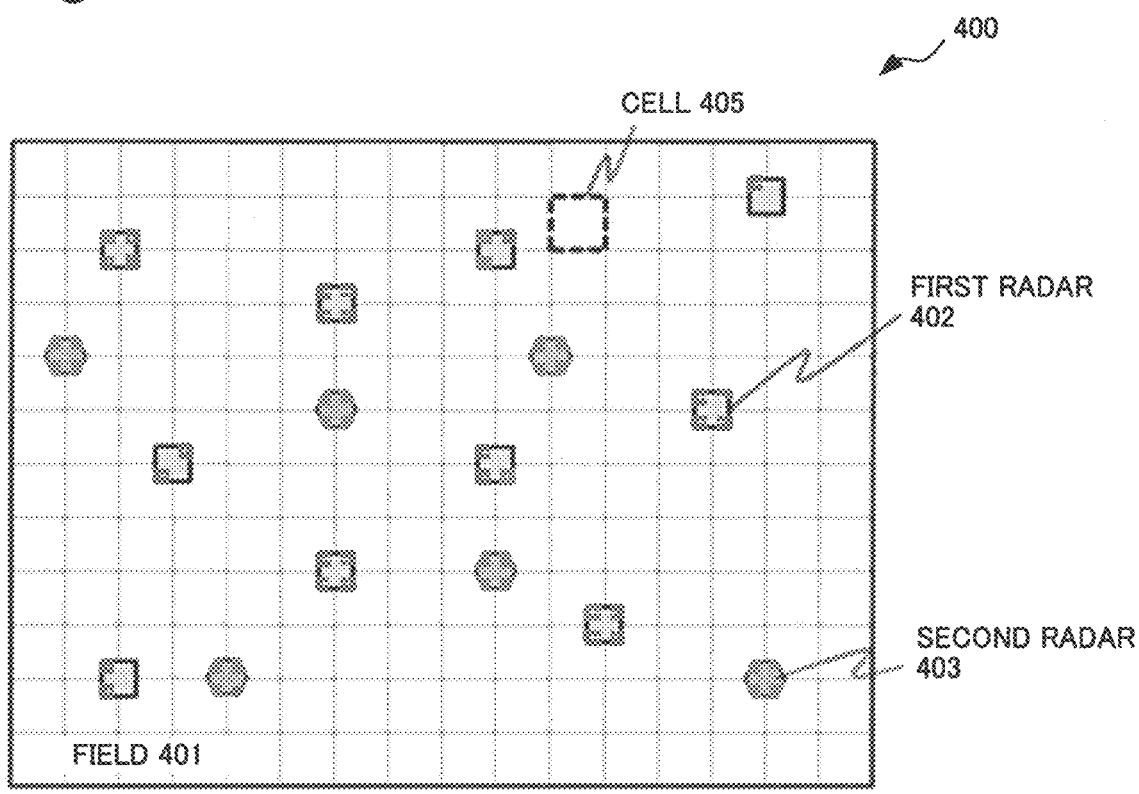
FIG. 5 is a conceptual diagram illustrating a configuration of a first specific example of the present invention.

FIG. 5 is a conceptual diagram illustrating a configuration of the first specific example of the present invention.

Figure 6:
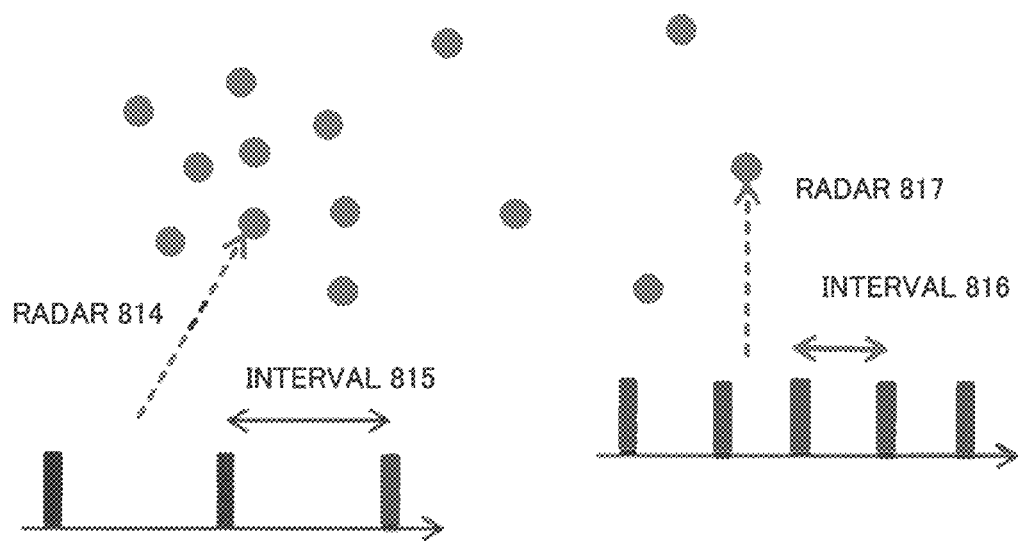
FIG. 6 is a schematic diagram illustrating an adjustment example of a resource use amount in a distributed small-sized radar system illustrated in FIG. 5.

FIG. 6 is a schematic diagram illustrating an adjustment example of a resource use amount in a distributed small-sized radar system illustrated in FIG. 5.

Figure 7:
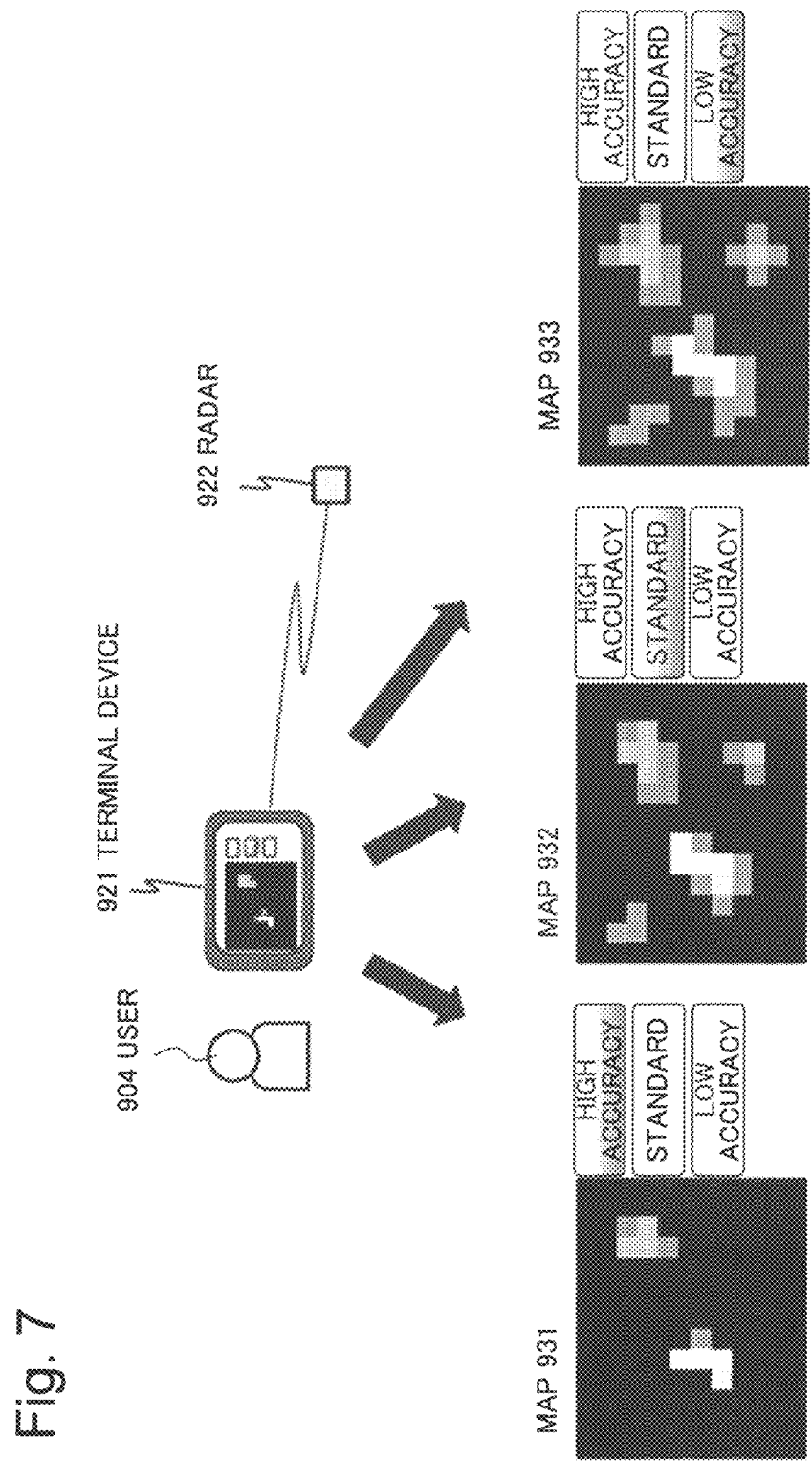
FIG. 7 is a schematic diagram illustrating an information example that can be referred to by a user in the distributed small-sized radar system illustrated in FIG. 5.

FIG. 7 is a schematic diagram illustrating an information example that can be referred to by a user in the distributed small-sized radar system illustrated in FIG. 5.

As illustrated in FIG. 5, the distributed small-sized radar system 400 includes a plurality of first radars 402 in which a position is unknown and a plurality of second radars 403 in which a position is known. The first radars 402 and the second radars 403 are allocated in a random manner within a field 401 that is a monitoring target. The field 401 is a two-dimensional space, and therein, a plurality of cells 405 divided in a grid shape that is a unit for identifying a position at a preset resolution are defined.

The distributed small-sized radar system 400 of the first specific example is intended to compute information (map information) indicating a probability in which any obstacle exists in each cell 405. Note that, in the present specific example, while a two-dimensional space in which a height direction is not considered is described as an example, the present specific example is also applicable to a three-dimensional space.

The second radar 403 can measure a position of the own device by using a GPS or the like. Alternatively, for the second radar 403, position information of the own device is input or set upon installation. Further, it is assumed that the first radar 402 and the second radar 403 can transmit and receive a signal such as a radio wave or a sound wave by using a specific frequency or modulation system in order to measure a mutual distance.

Based on the technique described in the above-described second example embodiment, the first radar 402 can identify own position by transmitting and receiving information to and from at least adjacent three or more second radars 403 (in a case where the field 401 is a three-dimensional space, four units or more).

The first radar 402 which identifies the position of the own device can take a role similar to a role of the second radar 403 for another first radar 402 whose position is unknown. In this manner, a position of each radar of the entire system is sequentially identified.

The first radar 402 and the second radar 403 are radars that measure distances to an obstacle that exists within a measurable range by detecting reflected waves of emitted radio waves. The first radar 402 and the second radar 403 are directional radars that sequentially emit radio waves having directionality of a narrow angle width in all directions or omnidirectional radars that simultaneously emit radio waves in all orientations in a predetermined angle range or in a spherical manner at a maximum level.

Further, the first radar 402 and the second radar 403 can identify, when they are directional radars, angles and distances of an obstacle with respect to installation positions of radars from reflected waves with predetermined accuracy. Further, the first radar 402 and the second radar 403 can identify, when they are omnidirectional radars, distances to an obstacle.

The first radar 402 and the second radar 403 start measurement at each predetermined interval, continuously emit a plurality of pulse waves, and thereby acquire distances to an obstacle multiple times by a single-time measurement. The first radar 402 and the second radar 403 determine conditional probabilities for acquiring a measurement result Z of distances upon existence of an obstacle in a cell X of any position (a hypothesis $\omega_1$) and upon no existence (a hypothesis $\omega_2$). The first radar 402 and the second radar 403 generate map information in the cell X by using probabilities as likelihood.

The map information is, assuming that a hypothesis set $\Omega=\{\omega_1, \omega_2\}$, a BBA defined for any subset $$A \in \{\phi, \{\omega_1\}, \{\omega_2\}, \Omega\} \qquad \text{[Logical expression 55]}$$

thereof. These BBAs are pieces of local map information generated by measurement executed by the first radar 402 and the second radar 403, and map information for a cell other than a measurable area is not defined.

Next, the first radar 402 and the second radar 403 form physical connection links, for example, by using a wireless network connected via WiFi or the like, by using radars adjacent in a predetermined distance or less as adjacent radars. The first radar 402 and the second radar 403 generate the above-described map information channel and the active node channel. The first radar 402 and the second radar 403 acquire, from the adjacent nodes, map information stored respectively, the number of currently active adjacent nodes, and a value of a scalar amount S for estimating a number of active nodes. Further, the first radar 402 and the second radar 403 update map information defined for each cell in accordance with the above-described method. Herein, the first radar 402 and the second radar 403 use a unit BBA as map information when map information in any cell X among map information of a own radar and adjacent radars is undefined. The first radar 402 and the second radar 403 execute integration processing for map information, by repeating update processing a previously-determined number of times or by continuing update processing until a change of a predetermined amount or more does not occur.

In this manner, map information of the entire field 401 (totally-integrated map information) is generated, and thereby all nodes include approximately the same map information. The first radar 402 and the second radar 403 can acquire map information of the entire field 401 that is unmeasurable by a single device.

The first radar 402 and the second radar 403 are set, as initial values, in such a way as to execute a series of processing from the above-described measurement to map information integration at an interval of constant times a minimum period. At that time, it is not always necessary for all radars within the field 401 to execute measurement at the same timing. However, when the number of radars that operate at the same timing is small, a coverage rate in a field and a total information amount acquired based on searches decrease. Therefore, in order to execute estimation with high accuracy, a measurement interval is preferably short.

However, there is a case in which a measurement condition such as topography is unclear in advance or a case in which an interference radio wave, a shielding material, or the like exists and thereby measurement accuracy based on a radar may decrease or accuracy of information communication between radars may decrease. Therefore, each radar determines, based on map information acquired by integration, a measurement accuracy of a cell X within an own search area by using a magnitude of the map information $m^X(\Omega)$. When $m^X(\Omega)$ is equal to or more than a predetermined magnitude, a radar determines that it is better to execute measurement with higher accuracy, causes an measurement interval to be short, and increases a probability for executing an operation simultaneously with another adjacent radar. On the other hand, when $m^X(\Omega)$ is smaller than the predetermined magnitude, a radar causes a measurement interval to be long.

As illustrated in FIG. 6, for example, since a radar 814 is located in an area where radars are crowded and a measurable area common to other surrounding radars is large, the radar 814 executes measurement and map information estimation at a long interval as in an interval 815. On the other hand, since a radar 817 is located in an area where radars are scattered, the radar 817 executes measurement and map information estimation at a short interval as in an interval 816.

Other than a measurement interval, there is an adjustment method such as increasing and decreasing the number of measurement times for one time or adjusting transmission power of a radio wave used for measurement. Alternatively, when each radar is currently located outside a measurable range of the own device and estimation accuracy of map information of a cell that becomes measurable by increasing transmission power of a radio wave is low, the following operation is executable. That is, a radar can enhance an estimation result after integration, by increasing transmission power of a radio wave to widen a measurable area, and generating map information of the cell.

As illustrated in FIG. 7, a user 904 can refer to totally-integrated map information by accesses a radar 922 (the first radar 402 or the second radar 403) adjacent from an own position by using a terminal device 921 and requesting information display.

Herein, an example of displaying an existence probability map of an obstacle is described.

A program for displaying an existence probability map of an obstacle is previously installed on the terminal device 921 held by the user 904. The terminal device 921 executes processing in accordance with the program and thereby displays an existence probability map of an obstacle, based on map information acquired from an adjacent radar 922.

The terminal device 921 calculates, as an initial value, a probability $P[\omega_1]$ in which an obstacle exists and a probability $P[\omega_2]$ for no existence from map information in a cell X by using above equation (24).

The terminal device 921 picks up a cell having a probability of a value equal to or more than a predetermined value that is preset, sets, for example, a different color (e.g. red and white) for each hypothesis, changes a color density or display intensity according to a value indicating a probability, and thereby displays the cell as a map 932. Further, the terminal device 921 can display, when a map having high accuracy is intended to be displayed, a map 931 in which a cell where an opinion conflict is small (small $m(\Phi)$) and uncertainty is small (small $m(\Omega)$ is subjected to probability display, or inversely display a map 933 that executes probability display in which a probability is low.

In this manner, the first specific example achieves a similar advantageous effect by using a configuration similar to the configuration of the second example embodiment.

Second Example Embodiment

Next, by using an ICT system 500 as an example, a second specific example of the present invention is described by using the drawings.

Figure 8:
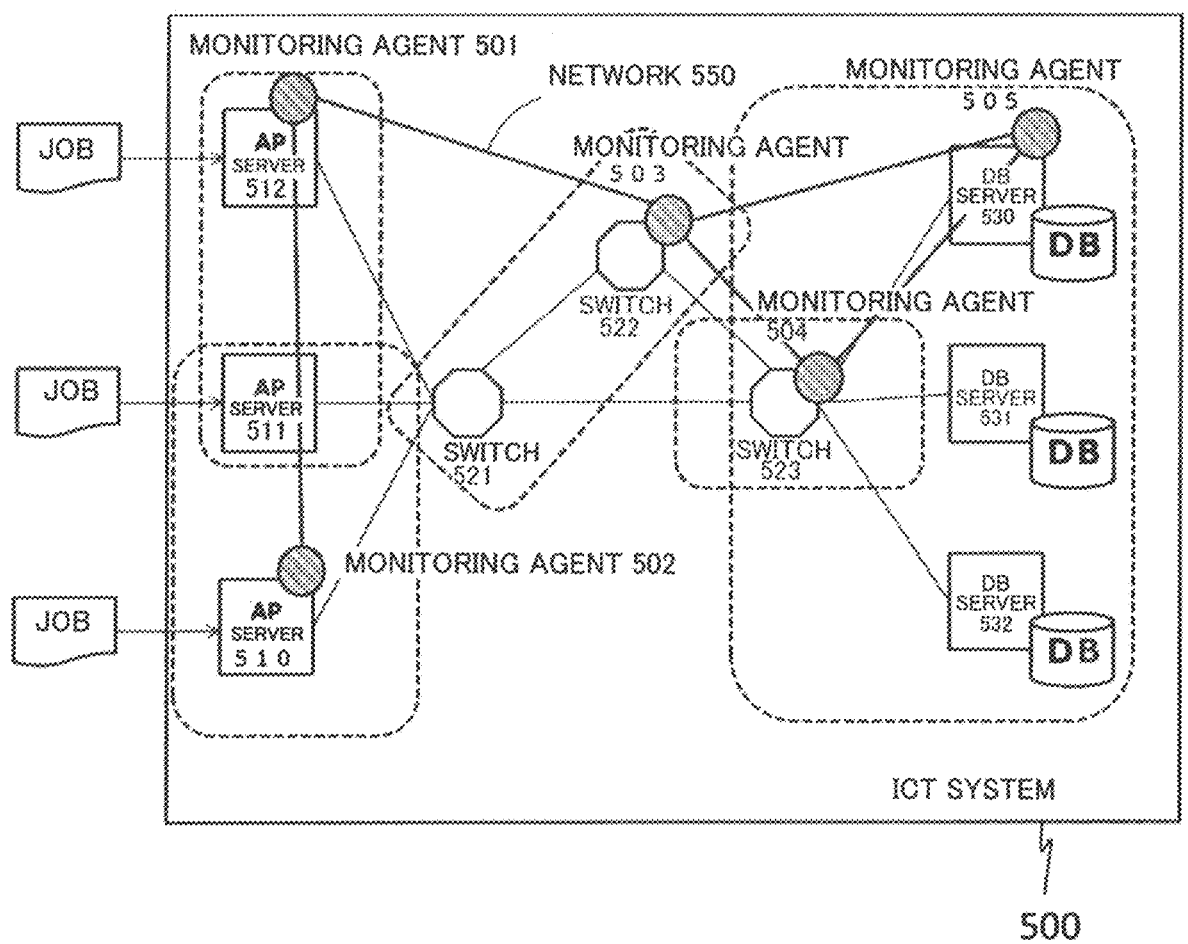
FIG. 8 is a conceptual diagram illustrating a configuration of a second specific example of the present invention.

FIG. 8 is a conceptual diagram illustrating a configuration of the second specific example of the present invention.

As illustrated in FIG. 8, the ICT system 500 includes a plurality of application (AP) servers 510, 511, and 512, and a plurality of network switches 521, 522, and 523. Further, the ICT system 500 includes a plurality of database (DB) servers 530, 531, and 532, and a plurality of monitoring agents 501, 502, 503, 504, and 505.

The application servers 510, 511, and 512 accept processing requests for jobs, respectively. The application servers 510, 511, and 512 access the database servers 530, 531, 532 via a network configured by the network switches 521, 522, and 523, receive necessary information, and execute job processing.

In a system in which, as above-mentioned manner, devices such as a plurality of servers are connected via a network and operate in association with each other, when a behavior different from a behavior during normal time is observed, it is difficult to identify an occurrence point of a failure. In a system as illustrated in FIG. 8, normally, a system administrator confirms a log of each network device or the like, identifies a failure factor for the log, eliminates the factor, and thereby executes trouble shooting.

In the second specific example, the monitoring agents 501 to 505 allocated in a distributed manner within the ICT system 500 individually estimate a cause, based on monitoring information such as a log, and identify a true cause by integrating individual estimation results.

The monitoring agents 501 to 505 are installed, as a program, on an application (AP) server, a network switch, and/or a database (DB) server. The monitoring agents 501 to 505 may be realized by operations, based on the program, of the application (AP) server, the network switch, and the database (DB) server or may be provided as a dedicated device.

It is unnecessary for the monitoring agents 501 to 505 to be provided for each of all network devices. For example, the monitoring agents 501 to 505 may collectively monitor a plurality of AP servers, network switches, and DB servers that are adjacent. Further, for the monitoring agents 501 to 505, there may be a network device not to be monitored. In order to increase estimation accuracy of a failure factor, preferably, there is more monitoring data such as log-data to be collected and analyzed by each of the monitoring agents 501 to 505. However, when a monitoring data amount to be collected and analyzed is increased, complexity and a calculation load necessary for analysis are increased. Therefore, a monitoring data amount to be collected and analyzed is a matter to be determined based on a performance requirement in design.

A network device surrounded by a dotted line of FIG. 8 indicates a monitoring target in the monitoring agents 501 to 505. The monitoring agents 501 to 505 measure operation statuses of network devices of respective monitoring targets and determine operation states.

A logical network 550 is formed among the monitoring agents 501 to 505. The network 550 forms a topology such that a reach from any monitoring agent to all other monitoring agents can be made.

All the monitoring agents 501 to 505 are set failure hypothetical sets $\Omega=\{\omega_1, \ldots, \omega_H, \omega_{other}\}$ in which assumed failures are collected. The number of assumed failures is H and $\omega_{other}$ represents other failures.

When, for example, an object is to identify in what network device a failure is occurring, there is a method for designating the following failures and the like. In other words, $\omega_1$ is designated as a failure of a network switch 1, $\omega_2$ is designated as a failure of a network switch 2, $\omega_3$ is designated as a failure of a network switch 3, . . . , and $\omega_4$ is designated as a failure of an AP server 1, and the like.

Herein, a union $\{\omega_1, \omega_2, \omega_3\}$ of a plurality of singleton hypotheses indicates a state where it is not possible to identify where a failure occurs in the ICT system 500. A method for generating a hypothetical set of failures is not limited thereto. In a method for generating a hypothetical set of failures, a hypothetical set may be generated according to an event intended to be identified. As a method for generating a hypothetical set of failures, a hypothesis easy to interpret or analyze may be determined based on ease of an operation, an experience, or the like.

The monitoring agents 501 to 505 collect a measurement result for monitoring from each network device to be managed. For example, in the case of a server, a syslog and the like is one example of the measurement result. However, the measurement result is not limited to thereto, and various monitoring items such as measuring a delay or band relating to transmission and reception are conceivable. The monitoring agents 501 to 505 set, from measurement results thereof, a BBA (referred to failure estimate information) for a subset A of a set $\Omega$ of failure factors to be estimated. The BBA may be set from an observation result in accordance with a predetermined rule, may be calculated from an empirical rule, or may be calculated by generating a failure model, defining a likelihood function, and using the likelihood function.

Note that it is unnecessary for the monitoring agents 501 to 505 to allocate a value in accordance with a singleton hypothesis as a measurement result. The monitoring agents 501 to 505 may allocate a value to a subset representing a failure that can be identified at a reasonable level from a measurement result and set, with respect to others, a value for m($\Omega$) in such a way that $\Sigma_A m(A)=1$ is satisfied.

Next, the monitoring agents 501 to 505 generate a failure estimate information channel and an active node channel relating to the map information channel in the first specific example. The monitoring agents 501 to 505 acquire failure estimate information of an adjacent monitoring agent, the number of currently active adjacent nodes (monitoring agents), and a scalar amount S for estimating a number of active nodes. The monitoring agents 501 to 505 repeat updating map information in accordance with the method described in the first example embodiment and the second example embodiment. As a result, map information is converged to totally-integrated failure estimate information in which failure factors estimated by each monitoring agent are integrated. The monitoring agents 501 to 505 can diagnose whether there is a possibility that what failure has occurred to what extent from the totally-integrated failure estimate information.

In the second specific example, a log collection management node necessary in a common system is unnecessary. A large-sized system requires a large collection load of log information and therefore is frequently constructed by combining a plurality of highly-autonomous subsystems. Therefore, in a large-sized system, it is frequently difficult to unitarily manage failure information.

When the second specific example is used, a cause can be identified in a distributed and cooperative manner and can be divided at an assumed failure point. Therefore, in the second specific example, a portion that is problematic in each subsystem can be avoided. When, for example, it is diagnosed that it is highly possible that a failure has occurred in any network switch or network subnet, the following processing is possible. That is, an application server can execute, via a network path that does not pass through a network device in which there is a concern about the failure, processing such as acquiring information from a database server.

Note that, in the second specific example, identification of a failure point in the ICT system 500 is described as an example. However, the second specific example is applicable as a monitoring system for cyber security.

The above-described monitoring agents 501 to 505 monitor and measure, for example, by replacing the failure with a security threat such as a malware infection, settings or behaviors of a management device, and generate totally-integrated security threat information in a distributed and cooperative manner. In this case, the monitoring agents 501 to 505 can execute an operation for identifying a malware infection or the like in a distributed and cooperative manner, while the operation being commonly executed by collecting monitoring and analysis results by a centralized server.

Therefore, even in the case of an aggregate of a plurality of different organizations or even when unitary management is difficult due to a large amount of log-data to be collected, the following processing can be rapidly executed. The processing refers to processing such as isolation of an infected computer or interruption of a subnetwork by identifying a threat to security.

In this manner, the second specific example achieves a similar advantageous effect by using a configuration similar to the configuration of the second example embodiment.

Third Specific Example

Next, by using a drone control system 600 as an example, a third specific example of the present invention is described by using the drawings.

The drone control system 600 provides a function of efficiently searching a field as described below by using a plurality of drones. The function is, for example, searching a survivor in need of help at a disaster site or the like, searching a victim from an inside of vast forest, identifying an area where harvesting is preferentially started by observing a growth state of cereal or the like in a vast farm, and the like.

Figure 9:
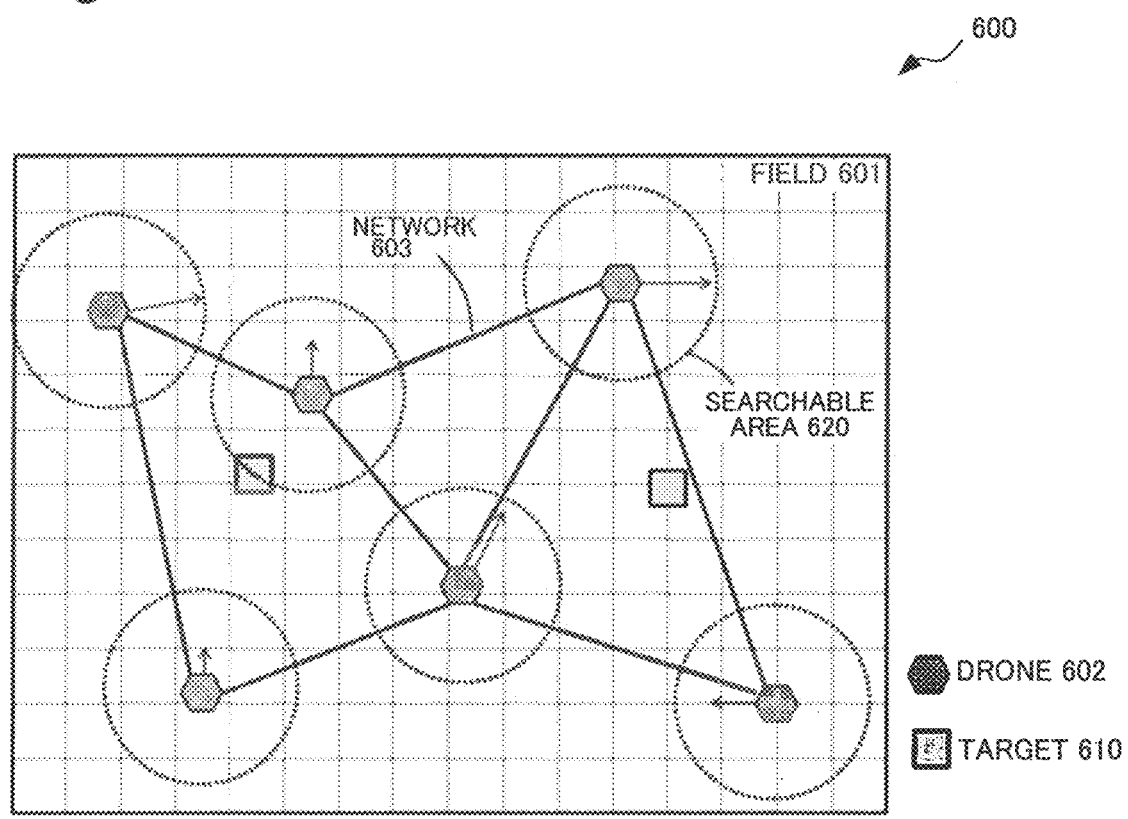
FIG. 9 is a conceptual diagram illustrating a configuration of a third specific example of the present invention.

FIG. 9 is a conceptual diagram illustrating a configuration of the third specific example of the present invention.

As illustrated in FIG. 9, the drone control system 600 includes a plurality of drones 602 mounted with sensing devices such as cameras, and are elements searching a target 610 whose position is unknown within a search field 601. A network 603 is configured among the plurality of drones 602. The drone 602 can exchange information with adjacent drones 602.

The drone 602 includes a navigation plan generation function and autonomously navigates while determining a navigation plan from a current position or a surrounding situation. The drone 602 may search an inside of the search field 601 with a predetermined randomness, and is not specified a detailed navigation route. However, it is preferable for the drone 602 to be specified an initial position and a rough coverage area assigned within the search field 601.

In the search field 601, similarly to the field 401 of the first specific example, a plurality of cells divided in a grid shape that is a unit for identifying a position at a preset resolution are defined.

The drone 602 periodically executes measurement for search within a searchable area 620 by using a sensing device and generates, as map information, information indicating a probability about whether a target 610 in each cell within the searchable filed 620 exists.

Herein, it is assumed that map information is defined as the above-described BBA for each cell within the search field 601. This BBA is a real value of m(A) allocated to any subset $A \subseteq \Omega$ in which a hypothetical set where $\omega_1$ indicates existence of a target and $\omega_2$ indicates no existence of a target is defined as $\Omega = \{\omega_1, \omega_2\}$. Therefore, the BBA is a four-dimensional vector amount. Hereinafter, the BBA is referred to as local map information.

The drone 602 generates a map information channel and an active node channel. The drone 602 acquires, from adjacent drone 602, pieces of map information stored respectively, the number of currently-active adjacent drone 602, and a value of a scalar amount S for estimating a number of active nodes (drone). The drone 602 acquires totally-integrated map information by repeating updating map information as described above.

Next, each drone 602 identifies, in the totally-integrated map information, an area in which it is conceivable that, since $m(\Omega)$ is large, uncertainty is high and area search is insufficient, an area in which it is conceivable that, since $$m(\phi)$$ [Math, 56]

is large, an opinion conflict is large and reliability is low, or the like. The drone 602 changes a navigation plan in such a way as to navigate an area in which it is conceivable that area search is insufficient or an area in which reliability is low with a higher priority than for other areas. As a method for generating such a navigation plan, there is a method for preferential search from an area closest to a position of own device among areas in which uncertainty is equal to or higher than a predetermined value or an opinion conflict is large, and the like. However, the method for generating a navigation plan is not limited thereto.

The drone 602 prioritizes, for example, search of an area that is not sufficiently searched in the beginning. For details, the drone 602 can be set a rule such as movement in a direction having a highest value among respective directions distant by a predetermined distance from a current position by referring to a value of each cell of $m(\Omega)$ as a contour of a field. Further, other than this, the drone 602 can employ, for example, a more complex rule such as preferential navigation to an area in which there are less drones 602 when the number of surrounding drones 602 is found or inclusion of random movement with a predetermined probability.

Further, an action object and a navigation plan generation rule are not necessarily the same for all drones 602. It is possible that, for example, with regard to objects of some drones 602, tracking for a target 610 is caused to have priority over map information generation of a field and the some drones 602 preferentially navigate an area in which $m(o)_i$ is large. In this case, the drone 602 can track the target 610 while collecting information having higher accuracy relating to the target 610.

In this manner, the third specific example produces a similar advantageous effect by using a configuration similar to the configuration of the second example embodiment.

The whole or part of the exemplary embodiments disclosed above can be described as, but not limited to, the following supplementary notes.

(Supplementary Note 1)

A distributed-cooperative-information-processing device allocated in a distributed manner within a predetermined field, the device includes:

a memory storing a program at least one processor coupled to the memory, the processor performing operations, the operation comprising:

measuring an environment by using a sensor device;

generating, based on a measurement result of the environment, estimate determination information being information indicating a probability of a hypothetical set of states in the environment;

receiving the estimate determination information generated by another distributed-cooperative-information-processing device within the field;

managing information of the another distributed-cooperative-information-processing device; and integrating the estimate determination information generated by own device and the estimate determination information received from the another distributed-cooperative-information-processing device.

(Supplementary Note 2)

The distributed-cooperative-information-processing device according to supplementary note 1, wherein the operations further comprises acquiring, from the another distributed-cooperative-information-processing device, information for estimating a number of the other distributed-cooperative-information-processing devices currently operating normally within the field.

(Supplementary Note 3)

The distributed-cooperative-information-processing device according to supplementary note 1 or 2, wherein the operations further includes:

mutually synchronizing times indicated by timers included in a plurality of distributed-cooperative-information-processing devices, respectively, allocated in a distributed manner within the field.

(Supplementary Note 4)

The distributed-cooperative-information-processing device according to any one of supplementary notes 1 to 3, wherein the operations further includes:

acquiring position information of the local device.

(Supplementary Note 5)

The distributed-cooperative-information-processing device according to any one of supplementary notes 1 to 4, wherein the operations further includes:

transmitting and receiving the estimate determination information to and from the another distributed-cooperative-information-processing device including a measurement result at a same point as for a measurement result.

(Supplementary Note 6)

The distributed-cooperative-information-processing device according to any one of supplementary notes 1 to 5, wherein the operations further includes:

changing a resource use state in the own device, based on the estimate determination information after integration processing.

(Supplementary Note 7)

The distributed-cooperative-information-processing device according to supplementary note 6, wherein the operations further comprises changing, as the resource use state, an operation interval of the own device, measurement performance, or a frequency of communication with the another distributed-cooperative-information-processing device.

(Supplementary Note 8)

The distributed-cooperative-information-processing device according to any one of supplementary notes 1 to 7, wherein the operations further includes:

displaying the estimate determination information in accordance with a request from a terminal device.

(Supplementary Note 9)

A distributed-cooperative-information-processing method to be executed by a distributed-cooperative-information-processing device allocated in a distributed manner within a predetermined field, the method includes:

measuring an environment by using a sensor device;

generating, based on a measurement result of the environment, estimate determination information being information indicating a probability of a hypothetical set of states in the environment;

receiving the estimate determination information generated by another distributed-cooperative-information-processing device within the field;

managing information of the another distributed-cooperative-information-processing device; and integrating the estimate determination information generated by own device and the estimate determination information received from the another distributed-cooperative-information-processing device.

(Supplementary Note 10)

The method according to supplementary note 9, further includes:

acquiring, from the another distributed-cooperative-information-processing device, information for estimating a number of the other distributed-cooperative-information-processing devices currently operating normally within the field.

(Supplementary Note 11)

A non-transitory computer-readable recording medium embodies a program. The program causes a computer allocated in a distributed manner within a predetermined field to perform a method. The method includes:

measuring an environment by using a sensor device;

generating, based on a measurement result of the environment, estimate determination information being information indicating a probability of a hypothetical set of states in the environment;

receiving the estimate determination information generated by another computer within the field;

managing information of the another distributed-cooperative-information-processing device that receive the estimate determination information;

managing information of the another computer; and integrating the estimate determination information generated by a local device and the estimate determination information received from the another computer.

(Supplementary Note 12)

The recording medium according to supplementary note 11, embodies the program further causes the computer to perform the method. The method further includes:

acquiring, from the another distributed-cooperative-information-processing devices, information for estimating a number of devices of the another distributed-cooperative-information-processing device being currently operating normally within the field.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-099441, filed on May 18, 2016, the disclosure of which is incorporated herein in its entirety by reference.

INDUSTRIAL APPLICABILITY

The present invention is applicable to monitoring, management, and security systems for a physical space based on a sensor network, a radar system, or the like. Further, the present invention is applicable to monitoring and management systems in a logical space such as an event monitoring system for a failure and the like in various types of distributed systems or a monitoring system as cyber security. Further, the present invention is applicable to a system logistics management, or supply chain management which includes a plurality of robots or drones. The present invention is applicable to a management system through sharing and determination which are distributed and cooperative of various types of determination information in a distributed system including an aggregate of a plurality of independent partial systems in which multimodal traffic system management for trains, automobiles, aircraft, or the like is a typical example.

REFERENCE SIGNS LIST

- 100 Information processing device
- 101 Computation device
- 102 Transitory storage device
- 103 Connection interface
- 104 Communication device
- 105 Measurement device
- 106 Non-transitory storage device
- 107 Power supply device
- 200, 300 Distributed-cooperative-information-processing device
- 201, 301 Interface unit
- 202, 302 Communication unit
- 203, 303 Adjacent management unit
- 204, 304 Integration unit
- 205, 305 Estimate computation unit
- 206, 306 Measurement and detection unit
- 307 Position management unit
- 308 Time synchronization unit
- 309 Resource control unit
- 310 Transfer control unit
- 320, 921 Terminal device
- 401 Field
- 402 First radar
- 403 Second radar
- 405 Cell
- 500 ICT system
- 501, 502, 503, 504, 505 Monitoring agent
- 510, 511, 512 Application server
- 521, 522, 523 Network switch
- 530, 531, 532 Database server
- 601 Search field
- 602 Drone
- 603, 701 Network
- 610 Target
- 620 Searchable area
- 702 Active node channel
- 703 Map information channel
- 814, 817, 922 Radar
- 815, 816 Interval
- 931, 932, 933 Map

What is claimed is:

1. A device of a plurality of distributed-cooperative-information-processing devices allocated in a distributed manner within a predetermined field and each of the devices including at least one sensor device measuring an environment of each of the devices, the device comprising:
   a memory storing a program;
   at least one processor coupled to the memory,
   the processor performing operations, the operations comprising:
   measuring an environment by using a sensor device included in the device;
   generating, based on a measurement result of the environment measured by using the sensor device, estimate determination information, the estimate determination information being information indicating a probability of a hypothetical set of states in the environment;
   receiving, from another device of the distributed-cooperative-information-processing devices within the field, another estimate determination information generated by the another device based on another measurement result of another environment measured by the another device using another sensor device included in the another device;
   managing information of the another device; and
   generating a totally-integrated estimate determination information by integrating the estimate determination information generated by the device and the another estimate determination information received from the another device.

2. The device according to claim 1, wherein
   the operations further comprises
   acquiring, from the another device, information for estimating a number of the distributed-cooperative-information-processing devices currently operating normally within the field.

3. The device according claim 1, wherein the operations further comprises:
   mutually synchronizing times indicated by timers included in a plurality of the distributed-cooperative-information-processing devices, respectively, within the field.

4. The device according to claim 1, wherein the operations further comprising: comprises:
   acquiring position information of the device.

5. The device according to claim 1, wherein the operations further comprising: comprises:
   transmitting the estimate determination information to the another device and receiving the another estimate determination information from the another device, the estimate determination information and the another estimate determination information including the measurement result at a same point within the field.

6. The device according to claim 1, wherein the operations further comprises:
   changing a resource use state in the device, based on the totally-integrated estimate determination information.

7. The device according to claim 6, wherein
   the operations further comprises
   changing, as the resource use state, an operation interval of the device, measurement performance, or a frequency of communication with the another device.

8. The device according to claim 1, wherein the operations further comprises:
   displaying the totally-integrated estimate determination information in accordance with a request from a terminal device.

9. A distributed-cooperative-information-processing method to be executed by a device of a plurality of distributed-cooperative-information-processing devices allocated in a distributed manner within a predetermined field and each of devices including at least one sensor device measuring an environment of each of the devices, the method comprising:
   measuring an environment by using a sensor device included in the device;
   generating, based on a measurement result of the environment measured by using the sensor device, estimate determination information, the estimate determination information being information indicating a probability of a hypothetical set of states in the environment;
   receiving, from another device of the distributed-cooperative-information-processing devices within the field, another estimate determination information generated by the another device based on another measurement result of another environment measured by the another device using another sensor device included in the another device;

managing information of the another distributed cooperative information processing device; and generating a totally-integrated estimate determination information by integrating the estimate determination information generated by the device and the another estimate determination information received from the another device.

10. The method according to claim 9, further comprising:

acquiring, from the another device, information for estimating a number of the distributed-cooperative-information-processing devices currently operating normally within the field.

11. A non-transitory computer-readable recording embodying a program, the program causing a computer of a plurality of distributed-cooperative-information-processing computers allocated in a distributed manner within a predetermined field and each of the computers including at least one sensor device measuring an environment of each of the computers to perform a method, the method comprising:

measuring an environment by using a sensor device included in the computer;

generating, based on a measurement result of the environment measured by using the sensor device, estimate determination information, the estimate determination information being information indicating a probability of a hypothetical set of states in the environment;

receiving, from another computer of the distributed-cooperative-information-processing computers within the field, another estimate determination information generated by the another computer based on another measurement result of another environment measured by the another computer using another sensor device included in the another computer;

managing information of the another computer; and generating a totally-integrated estimate determination information by integrating the estimate determination information generated by the computer and the another estimate determination information received from the another computer.

12. The recording medium according to claim 11, wherein embodying the program causing the computer to perform the method, the method further comprising:

acquiring, from the another computer, information for estimating a number of the plurality of distributed-cooperative-information-processing computers currently operating within the field.

* * * * *